(12) United States Patent
Roy et al.

(10) Patent No.: US 12,389,458 B2
(45) Date of Patent: Aug. 12, 2025

(54) JOINT COMMUNICATION AND SENSING AIDED RANDOM ACCESS CHANNEL

(71) Applicant: INTERDIGITAL PATENT HOLDINGS, INC., Wilmington, DE (US)

(72) Inventors: Arnab Roy, Phoenixville, PA (US); Sanjay Goyal, Deer Park, NY (US); Kevin T. Wanuga, Souderton, PA (US); Onur Sahin, London (GB); Ravikumar V. Pragada, Warrington, PA (US); Alpaslan Demir, East Meadow, NY (US); Mihaela C. Beluri, Jericho, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 417 days.

(21) Appl. No.: 17/765,498

(22) PCT Filed: Oct. 2, 2020

(86) PCT No.: PCT/US2020/054046
§ 371 (c)(1),
(2) Date: Mar. 31, 2022

(87) PCT Pub. No.: WO2021/067784
PCT Pub. Date: Apr. 8, 2021

(65) Prior Publication Data
US 2023/0254899 A1 Aug. 10, 2023

Related U.S. Application Data

(60) Provisional application No. 62/909,499, filed on Oct. 2, 2019.

(51) Int. Cl.
*H04W 74/0833* (2024.01)

(52) U.S. Cl.
CPC .............................. *H04W 74/0833* (2013.01)

(58) Field of Classification Search
None
See application file for complete search history.

(56) References Cited

U.S. PATENT DOCUMENTS 6,838,989 B1 * 1/2005 Mays ................. G06K 19/0723
342/51
7,843,988 B1 * 11/2010 Snodgrass ............ H04B 1/7097
375/146

(Continued)

FOREIGN PATENT DOCUMENTS

| CN | 110266618 B | 6/2021 |
| WO | 2018232090 A1 | 12/2018 |
| WO | 2019178824 A1 | 9/2019 |

OTHER PUBLICATIONS

Fujitsu, "Discussion on RAR in NR considering reciprocity issues," 3GPP TSG RAN WG1 Meeting #87, R1-1611462, Reno, USA (Nov. 14-18, 2016).

(Continued)

*Primary Examiner* — Gregory B Sefcheck
(74) *Attorney, Agent, or Firm* — VOLPE KOENIG

(57) ABSTRACT

Systems, devices and methods for a backscatter measurement based multiple RACH preamble transmissions are disclosed. A WTRU may receive a JCS-RS configuration comprising a minimum RACH preamble retransmission interval. The JCS-RS configuration may comprise a JCS backscatter power fraction ($\lambda$) of the WTRU transmit power ($P_{Tx}$). The WTRU may transmit a RACH preamble in a RACH occasion corresponding to a preferred SS/PBCH Index using an initial WTRU transmit beam, having an associated first RA-RNTI value. The backscatter power (Continued)

($P_{BS}$) may be measured using the WTRU receive beam corresponding to the WTRU transmit beam used for the RACH preamble transmission. On a condition that $P_{BS} > \lambda P_{Tx}$, the WTRU may retransmit the RACH preamble after a retransmission interval, on resources associated with a second RA-RNTI value. The WTRU may be configured for monitoring the PDCCH common search space with the first RA-RNTI and the second RA-RNTI, for respective RAR window intervals.

19 Claims, 10 Drawing Sheets

(56) References Cited

U.S. PATENT DOCUMENTS

| | | | |
|---|---|---|---|
| 9,373,014 B1 | 6/2016 | Mehranfar | |
| 10,278,160 B2 | 4/2019 | Agiwal et al. | |
| 10,856,239 B2* | 12/2020 | Jeon | H04W 52/36 |
| 11,224,068 B2* | 1/2022 | Qian | H04W 74/004 |
| 11,446,817 B2 | 9/2022 | Kim | |
| 2005/0143118 A1* | 6/2005 | Bernhardsson | H04W 52/246 |
| | | | 455/69 |
| 2009/0042582 A1* | 2/2009 | Wang | H04W 74/0866 |
| | | | 455/450 |
| 2010/0074130 A1* | 3/2010 | Bertrand | H04L 27/2692 |
| | | | 370/252 |
| 2012/0300715 A1 | 11/2012 | Pelletier et al. | |
| 2014/0334320 A1* | 11/2014 | Liu | H04L 5/0098 |
| | | | 370/252 |
| 2015/0023281 A1* | 1/2015 | Wu | H04W 72/21 |
| | | | 370/329 |
| 2016/0150484 A1* | 5/2016 | Seo | H04W 52/262 |
| | | | 455/522 |
| 2016/0212737 A1* | 7/2016 | Jang | H04L 5/001 |
| 2017/0257780 A1* | 9/2017 | Ryoo | H04W 36/0072 |
| 2017/0273058 A1* | 9/2017 | Agiwal | H04B 7/0617 |
| 2017/0295500 A1 | 10/2017 | Sun et al. | |
| 2018/0212694 A1 | 7/2018 | Jheng et al. | |
| 2018/0324853 A1* | 11/2018 | Jeon | H04W 74/08 |
| 2018/0332625 A1 | 11/2018 | Tsai | |
| 2019/0045457 A1 | 2/2019 | Islam et al. | |
| 2019/0053176 A1* | 2/2019 | Lee | H04L 5/0092 |
| 2019/0159181 A1* | 5/2019 | Manolakos | H04W 72/23 |
| 2019/0173543 A1 | 6/2019 | Ganesan et al. | |
| 2019/0230603 A1* | 7/2019 | Liu | H04W 52/42 |
| 2019/0273637 A1* | 9/2019 | Zhang | H04B 5/72 |
| 2019/0274144 A1 | 9/2019 | Zhang et al. | |
| 2019/0349866 A1* | 11/2019 | Lin | H04W 52/242 |
| 2019/0394805 A1* | 12/2019 | Kim | H04B 7/0404 |
| 2020/0107235 A1* | 4/2020 | Peisa | H04B 7/0617 |
| 2020/0267667 A1* | 8/2020 | MolavianJazi | H04W 72/0446 |
| 2020/0280416 A1* | 9/2020 | Gao | H04L 5/0098 |
| 2020/0288503 A1* | 9/2020 | Sahlin | H04W 16/28 |
| 2020/0350971 A1* | 11/2020 | Hakola | H04L 1/1812 |
| 2020/0383147 A1* | 12/2020 | Yoon | H04L 27/2607 |
| 2020/0389220 A1* | 12/2020 | Kang | H04W 72/046 |
| 2021/0051710 A1* | 2/2021 | Cirik | H04W 74/0833 |
| 2021/0058999 A1* | 2/2021 | Chen | H04W 76/19 |
| 2021/0345141 A1* | 11/2021 | Cao | H04W 24/10 |
| 2021/0351887 A1* | 11/2021 | Qi | H04L 5/005 |
| 2021/0409173 A1* | 12/2021 | Chatterjee | H04L 5/0053 |
| 2022/0039026 A1* | 2/2022 | Sharma | H04W 52/283 |
| 2022/0141074 A1* | 5/2022 | You | H04L 27/2666 |
| | | | 375/262 |
| 2022/0167279 A1* | 5/2022 | Zhou | H04W 52/146 |
| 2022/0225119 A1* | 7/2022 | Liberg | H04L 5/0048 |
| 2022/0225121 A1* | 7/2022 | Wanuga | H04L 5/0048 |
| 2022/0311492 A1* | 9/2022 | Wu | H04L 5/0051 |
| 2022/0321179 A1* | 10/2022 | Mungara | H04B 7/0634 |

OTHER PUBLICATIONS

Hsu et al., "Enabling Identification and Behavioral Sensing in Homes using Radio Reflections," CHI 2019, Glasgow, Scotland, UK (May 4-9, 2019).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Intel Corporation, "NR random access procedure," 3GPP TSG RAN WG1 #88bis, R1-1706172, Spokane, USA (Apr. 3-7, 2017).

Jin et al., "Fireworks: Channel Estimation of Parallel Backscattered Signals," 19th ACM/IEEE International Conference on Information Processing in Sensor Networks (IPSN), pp. 85-96 (2020).

Liu et al., "Backscatter Multiplicative Multiple-Access Systems: Fundamental Limits and Practical Design," arXiv: 1711.10694v1 (Nov. 30, 2017).

Samsung, "Discussion on NR Random Access Testing," 3GPP TSG-RAN WG4 Meeting #88Bis, R4-181xxxx (R4-1813201), Chengdu, China (Oct. 8-12, 2018).

Samsung, "New WID: Further enhancements on MIMO for NR," 3GPP TSG RAN Meeting #86, RP-193133, Sitges, Spain (Dec. 9-12, 2019).

Samsung, "Summary of email Discussion for FR2 specific enhancements," 3GPP TSG RAN Meeting #86, RP-192437, Sitges, Spain (Dec. 9-12, 2019).

Third Generation Partnership Project, "Technical Specification Group Radio Access Network; NR; Physical layer procedures for control (Release 15)," 3GPP TS 38.213 V15.5.0 (Mar. 2019).

Third Generation Partnership Project, "Technical Specification Group Radio Access Network; NR; Physical layer procedures for control (Release 15)," 3GPP TS 38.213 V15.7.0 (Sep. 2019).

Third Generation Partnership Project, "Technical Specification Group Radio Access Network; NR; Physical layer procedures for control (Release 15)," 3GPP TS 38.213 V15.11.0 (Sep. 2020).

Third Generation Partnership Project, "Technical Specification Group Radio Access Network; NR; Physical layer procedures for control (Release 16)," 3GPP TS 38.213 V16.2.0 (Jun. 2020).

Third Generation Partnership Project, "Technical Specification Group Radio Access Network; NR; Medium Access Control (MAC) protocol specification (Release 15)," 3GPP TS 38.321 V15.5.0 (Mar. 2019).

(56) References Cited

OTHER PUBLICATIONS

Third Generation Partnership Project, "Technical Specification Group Radio Access Network; NR; Medium Access Control (MAC) protocol specification (Release 15)," 3GPP TS 38.321 V15.7.0 (Sep. 2019).

Third Generation Partnership Project, "Technical Specification Group Radio Access Network; NR; Medium Access Control (MAC) protocol specification (Release 15)," 3GPP TS 38.321 V15.9.0 (Jul. 2020).

Third Generation Partnership Project, "Technical Specification Group Radio Access Network; NR; Medium Access Control (MAC) protocol specification (Release 16)," 3GPP TS 38.321 V16.1.0 (Jul. 2020).

Third Generation Partnership Project, "Technical Specification Group Radio Access Network; NR; Physical channels and modulation (Release 15)," 3GPP TS 38.211 V15.5.0 (Mar. 2019).

Third Generation Partnership Project, "Technical Specification Group Radio Access Network; NR; Physical channels and modulation (Release 15)," 3GPP TS 38.211 V15.7.0 (Sep. 2019).

Third Generation Partnership Project, "Technical Specification Group Radio Access Network; NR; Physical channels and modulation (Release 15)," 3GPP TS 38.211 V15.8.0 (Dec. 2019).

Third Generation Partnership Project, "Technical Specification Group Radio Access Network; NR; Physical channels and modulation (Release 16)," 3GPP TS 38.211 V16.3.0 (Sep. 2020).

Zhang et al., "WiDetect: Robust Motion Detection with a Statistical Electromagnetic Model," Proceedings of the ACM on Interactive, Mobile, Wearable and Ubiquitous Technologies (IMWUT), vol. 3, No. 3, Article 122:1-24 (Sep. 2019).

CATT, "UE Wakeup Mechanism and On-Demand Access for fNB-IoT UE Power Saving," 3GPP TSG RAN WG1 Meeting #88bis, R1-1704532, Spokane, WA, USA (Apr. 3-7, 2017).

Fraunhofer Hhi, "Franunhofer View on Release 17," 3GPP RAN Plenary #84 Release 17 Workshop, RP-191229 (Jun. 4, 2019).

Qualcomm Incorporated, "Power Ramping and Power Control for RACH Procedure," 3GPP TSG-RAN WG1 Meeting #89AH, R1-1711147, Qingdao, China (Jun. 27-30, 2017).

Wang et al., "Backscatter communication technology and Internet of Things," Chinese Hournal of Internet of Things (Jun. 30, 2017).

\* cited by examiner

US 12,389,458 B2

JOINT COMMUNICATION AND SENSING AIDED RANDOM ACCESS CHANNEL

CROSS-REFERENCE TO RELATED APPLICATIONS

This application is the U.S. National Stage, under 35 U.S.C. § 371, of International Application No. PCT/US2020/054046 filed Oct. 2, 2020, which claims the benefit of U.S. Provisional Application No. 62/909,499, filed Oct. 2, 2019, the contents of which are incorporated herein by reference.

BACKGROUND 5G technologies and systems are designed to operate in the upper frequency bands. These upper frequency bands converge with frequency bands used by different technologies, such as radar and mobile communication systems. Moreover, there has been a significant uptake in consumer devices with radar sensing capabilities. Given the convergence of the frequency bands between radar and mobile communications and the ubiquity of consumer devices with radar capability, technologies that can jointly handle communications and sensing on the same platform may be more cost effective and have lower complexity as compared to two independent platforms.

SUMMARY

Systems, devices and methods for a backscatter measurement based multiple random access channel (RACH) preamble transmissions are disclosed. A wireless transmit/receive unit (WTRU) in accordance with the present disclosure may comprise a receiver configured to receive a Joint Communications and Sensing (JCS) Reference Signal (RS) (JCS-RS) configuration, wherein the JCS-RS configuration includes a JCS backscatter power fraction ($\lambda$) of the WTRU transmit power ($P_{Tx}$) ($\lambda P_{Tx}$) and a minimum random access channel (RACH) preamble re-transmission interval ($T_{ReTx}$). The WTRU may also comprise a transmitter configured to transmit a RACH preamble in a RACH occasion corresponding to a preferred synchronization signal block (SSB) index, using an initial transmit beam having an associated first random access radio network temporary identifier (RA-RNTI) value. The WTRU may further comprise circuitry configured to measure backscatter power ($P_{BS}$) using a receive beam corresponding to the initial transmit beam. On a condition that $P_{BS} > \lambda P_{Tx}$ and no response is received within the re-transmission interval ($T_{ReTx}$), the transmitter may be configured to retransmit the RACH preamble on resources associated with a second RA-RNTI value. The receiver may be configured to monitor the physical downlink control channel (PDCCH) common search space with the first RA-RNTI for a first random access response (RAR) window interval and the second RA-RNTI for a second RAR window interval.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
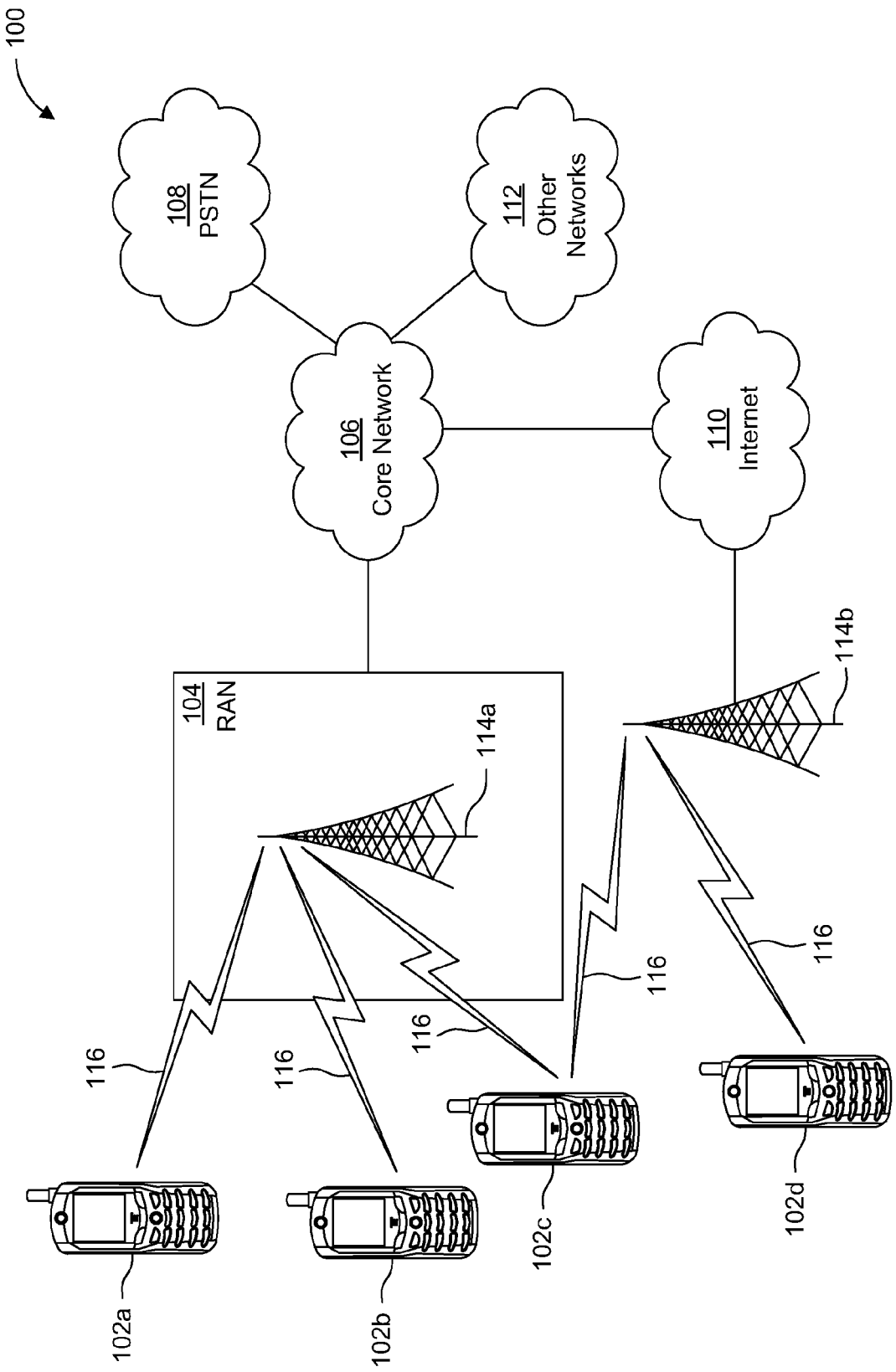
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
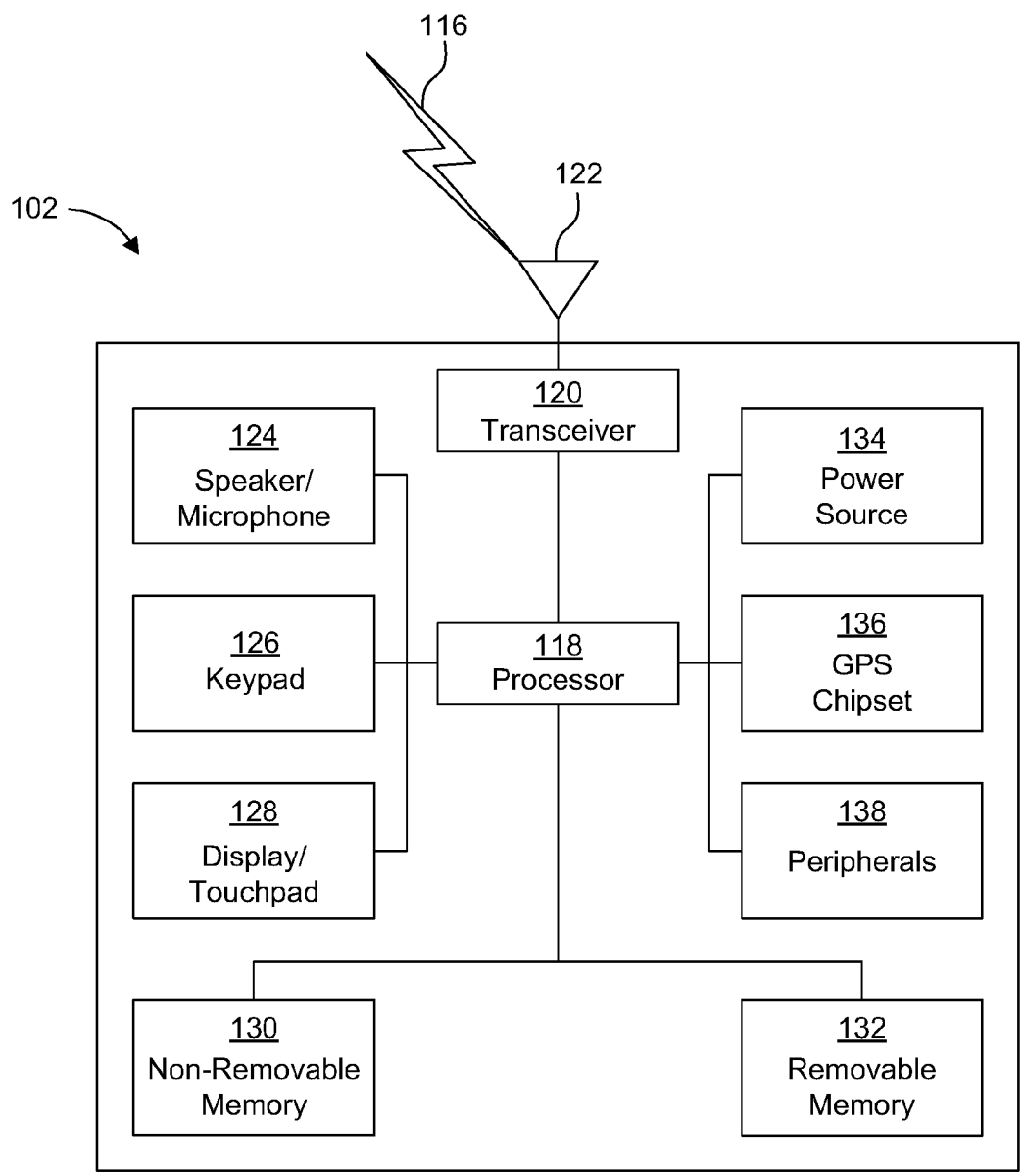
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
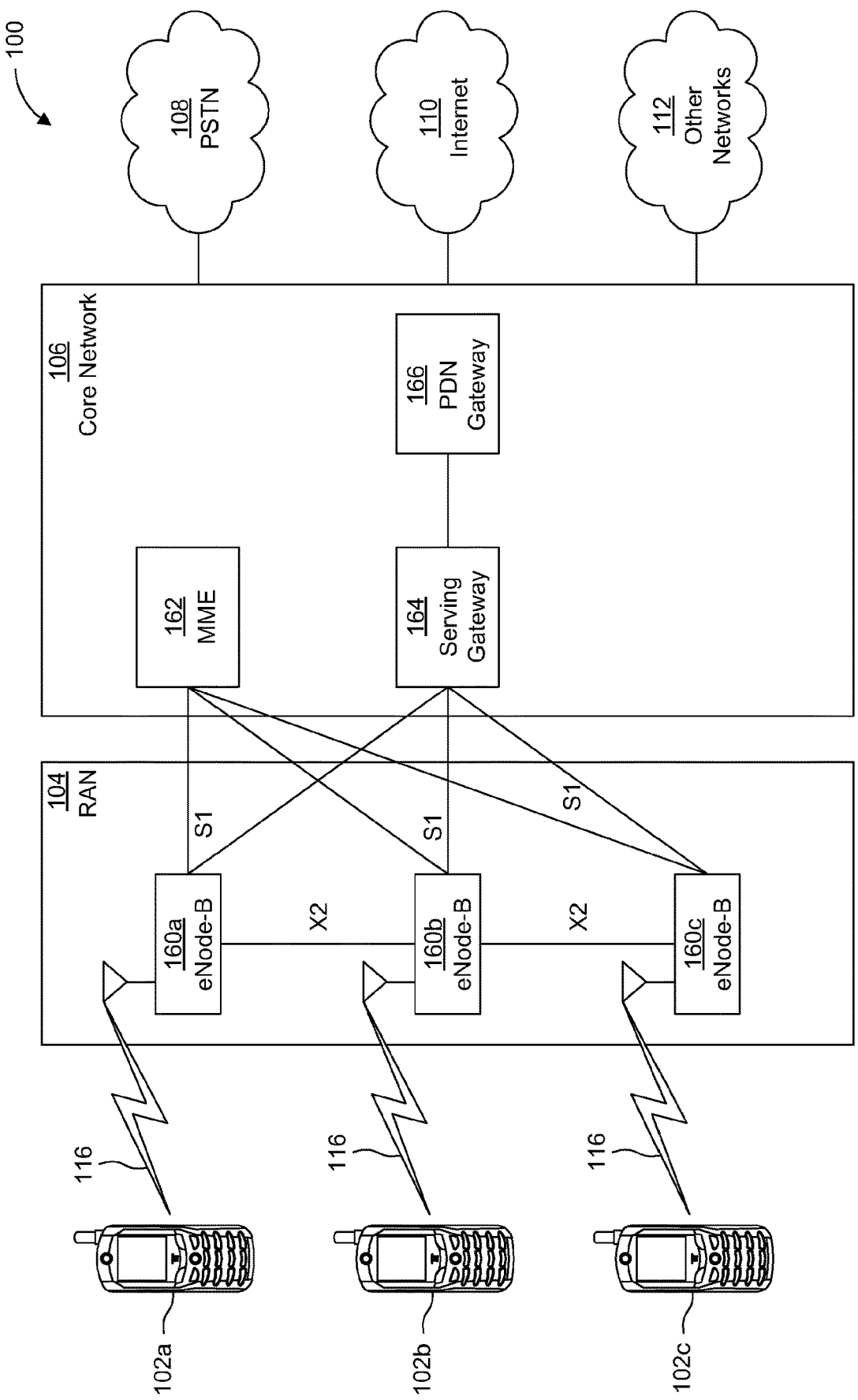
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11 ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11 ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
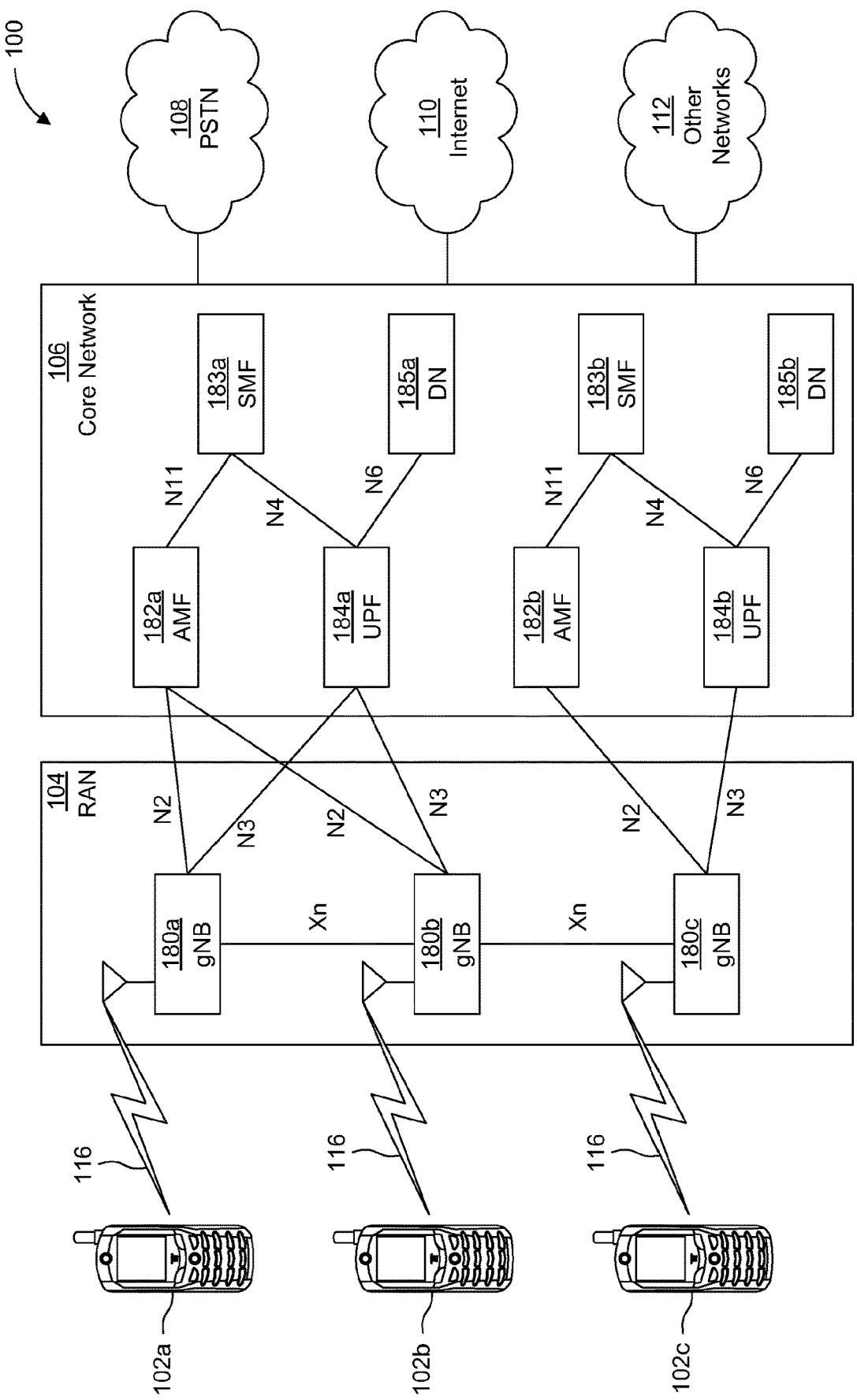
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

There is a continuous need for higher user data rates, increased cell capacity, reduced latency, and support for IoT. In addition to the traditional sub-6 GHz frequency bands, 5G wireless systems are using higher frequency bands (e.g., above 6 GHz and in the mmWave spectrum), where large swaths of spectrum are available.

Due to the large available bandwidths in the mmWave, these bands may be useful for delivering very high data rates, addressing the Enhanced Mobile Broadband (eMBB) use case, and may also be used for enhanced positioning applications. Although higher frequency bands provide advantages in terms of available bandwidth, attainable data rates, and increased accuracy for positioning, propagation in the higher frequency bands, such as mmWave bands, suffers from severe attenuation and blockage. To mitigate the path loss, highly directional systems, such as highly directional beamforming, may be required. Although beamforming was used in 4G systems, the need for additional transmit/receive (Tx/Rx) gains to compensate the high path loss in mmWave requires even more directional systems. For example, current specifications provide support for up to 64 beams for frequency ranges up to 52.6 GHz. However, it is expected that for frequencies above 52.6 GHz, the number of beams may further increase, and the corresponding beam widths may also decrease (leading for example to the use of "pencil" beams).

To maintain the link for directive systems supporting a high number of beams and narrow beams, and to mitigate the impairments specific to mmWave bands (e.g. blockage and/or misalignment of beams), beam management procedures are needed. Although beam management procedures for frequency bands below 52.6 GHz are defined, there is a large overhead associated with beam management. The overhead may increase, as the number of beams increases and the beam width decreases for higher frequency bands.

The availability of large amounts of spectrum, e.g., large channel bandwidths may enable other applications, such as enhanced positioning, as the large channel bandwidth leads to increased resolution in ranging/positioning. Further, enhanced positioning information provides high resolution detection of objects in an environment, resulting in a clearer physical estimation of the operating environment, e.g., radio environment mapping. For wireless networks, this may imply detection of static and/or mobile obstacles and multipath characteristics, which are critical for configuration and optimization of these systems.

Since ranging (e.g. radar), enhanced positioning, and high data rates communications applications all benefit from the use of wide channel bandwidths, it may be beneficial to consider technologies that jointly address communications and sensing. Joint Communications and Sensing (JCS) technologies may help reduce the complexity and cost, by using a common framework for seamless and coordinated operation of communication layer and in-band radar.

Key performance indicators of radar systems may be used as evaluation metrics. Basic functions of radar are inherent in the word radar, which is itself an acronym for the phrase radio detection and ranging. Additionally, the ability to determine bearing, or angular position of a target with respect to the transmitter has been made available through directional transmission of radar signals. Finally, the estimation of a target's velocity from the target's Doppler frequency has become a fundamental function of radar systems as well.

Detection, as a fundamental function of radar, refers to a system's ability to discriminate a target from the background noise and radar clutter of the environment in which the target resides. Key performance indicators of a radar's detection capability include detection range and resolution and the radar's ability to distinguish between multiple targets on the same bearing and/or range to the radar system.

Detection range may be improved through increasing transmit power and/or receiver sensitivity of the radar system. However, detection range may be affected by the radar's operating frequency, which may result in both different path loss of the radar signal and a different radar cross section (RCS) of the target being detected. RCS refers to the measure of a target's ability to reflect radar signals in the direction of the radar receiver. The RCS is a function of the material composition of the target, the targets bearing, orientation, and geometry, as well as the frequency of the radar signal being used for detection. Range resolution is typically a function of a radar pulse's duration, in non-coherent detection, or a radar pulses bandwidth, in coherent detection.

A radar's ranging capability refers to the radar system's ability to estimate the distance of the target to the radar receiver. Ranging accuracy is typically characterized as a ranging resolution, which refers to both the margin of uncertainty for a radar system's range estimate, and the minimum distance between two targets such that the radar system can detect both objects. In non-coherent radar detection, the radar system's range resolution decreases linearly with the radar transmission's pulse width. In coherent radar detection, the range resolution can be improved linearly with system bandwidth.

A target's bearing, or angular position relative to the radar, can be obtained from directional transmission of radar signals to isolate reflections from a limited direction of arrival. In analog beamforming, the limit of angular resolution is determined by the beam width of the radar transmission. Angular resolution may be improved with smart array radar systems, where the limiting factor becomes estimation error from system noise.

Estimating a target's velocity is a capability of radar enabled by the Doppler shift of signals reflected off of the target while it is in motion. A shift in the frequency of the reflected waveform relative to the transmitted waveform indicates target mobility proportional to the magnitude of the frequency shift. Estimating target velocity may be challenging due to the presence of multiple targets and/or multi-path reflections which can require sophisticated algorithms to isolate target sources, and lead to estimate instability. Additionally, estimating the velocity of an accelerating target can complicate velocity estimation.

Radar waveforms may be classified as either continuous wave radar or pulse modulation radar. Continuous wave radar refers to radar architectures in which a radar signal is transmitted and received continuously, while pulse modulation radar refers to systems in which the transmission and reception are duplexed in time. Communication waveforms may also use of phase, frequency and amplitude modulation to aid in the detection of targets.

Pulsed radar may emit short pulses and may receive echo signals in a silent period. This method may be characterized by very short transmission pulses followed by very large pauses, which are referred as receiving times. Pulsed radar systems may be capable of estimating target range and bearing, particularly in the presence of multiple targets. However, pulsed radar systems may suffer from a minimum detection range determined by the time the signal must propagate before the radar can transmit the radar pulse and switch to receive mode to detect the reflection.

Continuous wave (CW) radar systems may emit electromagnetic radiations at all times. A CW radar transmitting unmodulated signal can measure only the speed of a reflecting target using the Doppler effect. However, CW radar cannot measure the range and it cannot differentiate between two or more targets. A CW radar system may be used to measure range by employing frequency modulation giving rise to Frequency Modulated Continuous Wave (FMCW) radars. By measuring the frequency of the returning signal, the time delay between the transmission and reception may be measured and therefore. In this way, the range can be determined.

One advantage of CW radar is that energy is not pulsed, thereby making CW radar systems simpler to manufacture and operate. They may not have a minimum or maximum range, although the transmit power imposes a practical limit on range. CW radar may maximize total power on a target because the transmitter is broadcasting continuously. On the other hand, a pulsed radar system typically provides greater measurement range compared to a CW radar, such as an FMCW radar system, with lower power consumption.

Therefore, although CW radar systems do not have a minimum ranging distance, and may offer a more natural framework for estimating a target's velocity, they may perform sub-optimally in multi-target scenarios, or with rich multipath.

Designing radar waveforms that may coexist optimally with modern wireless and mobile communication systems, a natural selection of waveform may be pulsed phase and amplitude modulated waveforms. These types of signals are most similar to those of wireless communications standards in broad use globally.

Figure 2B:
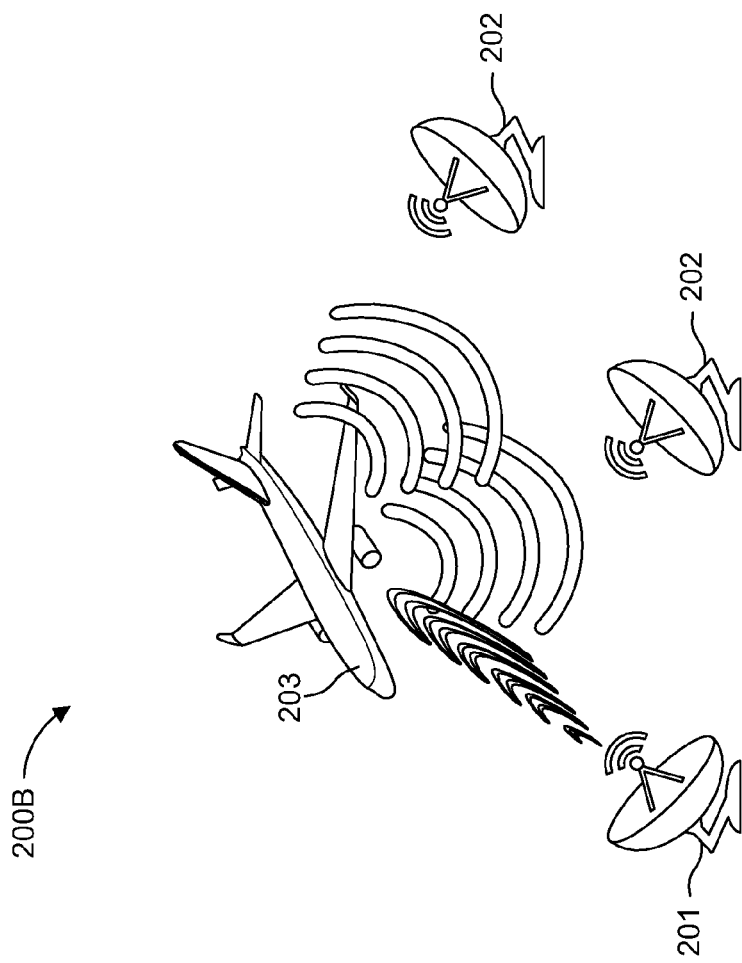
FIG. 2B is a diagram illustrating a multi-static radar architecture, according to an embodiment.
Figure 2A:
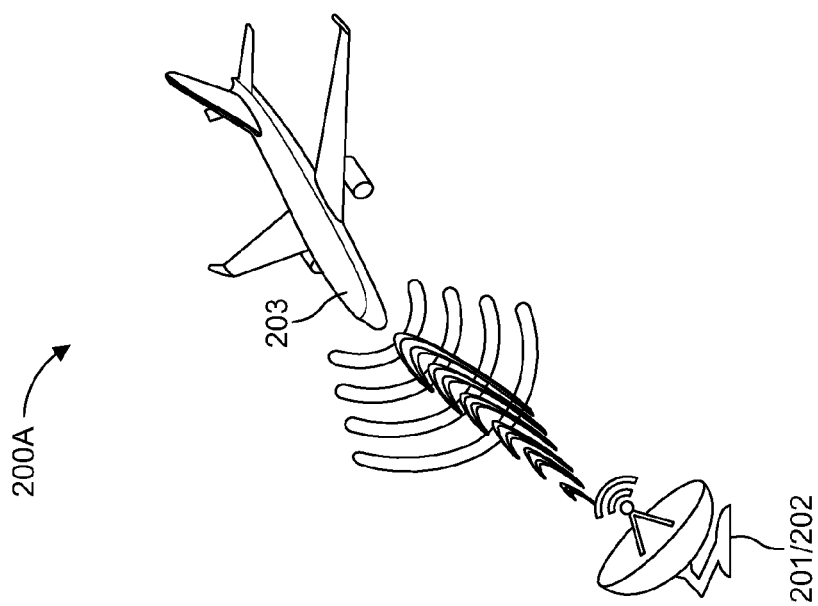
FIG. 2A is a diagram illustrating a mono-static radar architecture, according to an embodiment.

FIG. 2A illustrates a mono-static radar architecture 200A, according to an embodiment, and FIG. 2B illustrates a multi-static radar architecture 200B, according to an embodiment. In the mono-static radar architecture 200A, a transmitter 201 and a receiver 202 are co-located. Transmission is performed by a single radio of the transmitter 201 and reception of the signal reflected off a target 203 is performed by the collocated receiver 202. A bistatic radar configuration employs two sites, transmitter 201 and receiver 202, which are not collocated. The transmitter 201 may transmit a signal in the direction of the target 203 to be located, and the signal reflected off the target 203 may be received at the separate receiver 202. In multi-static radar architectures, such as the multi-static radar architecture 200B illustrated in FIG. 2B, transmission is performed by a single radio of the transmitter 201 and reception is performed by one or more devices 202 at separate locations. Other multi-static configurations may use multiple transmitters and a single receiver, or even multiple transmitters and multiple receivers; However, in these configurations, coordination between the nodes may be needed.

Mono-static radar architectures may make use of a single radio architecture to limit challenges with time and frequency synchronization, but may have issues with a lack of signal diversity. Mono-static radar architectures may offer poor performance in non-LOS scenarios, or may have sub-optimal detection performance with objects of small RCS. Detection performance and range may be increased with the use of multi-static architectures. However, multi-static architectures may also increase implementation complexity required to coordinate transmission and reception between multiple disparate radios.

Both monostatic and bistatic radar architectures may be used with existing wireless communications hardware, where the reflections of the transmitted signal may be observed by the radio that originally made the transmission or the device that was configured to receive it. Mono-static radar architectures, however, may have issues with a minimum ranging distance, due to differences in waveform design between radar systems and communications systems. Unless wireless devices have full-duplex capability, large transmission periods may result in impractically large minimum ranging distances. This limitation may be overcome with multi-static or bistatic radar architectures, although network topologies need to enable point-to-point and point-to-multi-point transmission for optimal design.

Re-purposing conventional communications hardware for the purposes of wireless sensing has value. Making use of existing wireless chipsets for wireless sensing enables new classes of services that can be deployed rapidly and achieve fast market penetration with little infrastructure expense, owing to the ubiquity of these chipsets now present in wireless handsets, vehicles, and IoT devices. New applications that have been demonstrated in proof-of-concept are shown in Table 1.

TABLE 1

Use cases and applications of wireless sensing technologies

| Use Case | Applications |
| --- | --- |
| Health Monitoring | Heartbeat Detection |
|  | Respiration Rate Monitoring |
|  | Sleep Apnea Detection |
|  | Fall Detection |
| Gesture Recognition | Human Activity Recognition |
|  | Keystroke Detection |
|  | Sign Language Recognition |
|  | Lip Motion Recognition |
| Context Acquisition | Localization |
|  | Direction Finding |
|  | Range Estimation |
| Device Authentication | Access Control |
|  | Intrusion Detection |
|  | Abnormality Detection |

A gNB and/or a WTRU may use a random access (RA) procedure, for example for WTRU initial access, UL timing alignment and/or other purposes.

In order to perform initial access, a WTRU may monitor for one or more synchronization signal/physical broadcast channel (SS/PBCH) block or synchronization signal block (SSB) transmissions from a gNB. Each SSB may have its own index (SSB index). The WTRU may determine a preferred SS/PBCH block or SSB index. In some embodiments, this determination is based on Reference Signal Received Power (RSRP) measurement, where the preferred SS/PBCH block may be the one which is received with the maximum RSRP value. In order to find the best beam-pair link, the WTRU may use one or multiple of its receive beams to receive SS/PBCH blocks.

The WTRU may transmit a preamble sequence, such as a physical random access channel (PRACH) preamble sequence or RA preamble at a power level. The WTRU may transmit the preamble using a resource, such as a time/frequency resource(s) (i.e., RACH occasion(s)) associated with the preferred SS/PBCH block. To transmit the preamble sequence, the WTRU may use optimum spatial domain transmission filter (i.e., transmit beam, Tx) corresponding to the spatial domain receive filter (i.e., receive beam, Rx) used to receive the preferred SS/PBCH block. In some embodiments, the preferred SS/PBCH block is the one with a maximum RSRP.

The preamble transmission power may be based on configured parameters and/or measurements. The WTRU may receive parameters that may be provided by the gNB (configured parameters). The parameters may include one or more of initial preamble power, a random access response (RAR) window size, a power ramping factor, and a maximum number of retransmissions.

The time-frequency resource(s) for preamble transmission (i.e., RACH occasion(s)) may be chosen by the WTRU from an allowed set of RACH occasions allocated for each SS/PBCH block. The configuration parameters to derive the SS/PBCH blocks to RACH occasions mapping may include slot numbers, starting symbol, number of PRACH occasions within a RACH slot, PRACH duration, number of SSBs mapped to each PRACH occasion, number of PRACH occasions frequency multiplexed in one time instance, starting PRB, etc. The configuration parameters may be provided by the gNB.

The PRACH resources, which may include preambles or sets of preambles, may be provided or configured by the gNB. The WTRU may determine the preamble sequence based on the configuration parameters. The configuration parameters, which may be provided by the gNB, may include index to logical root sequence table, cyclic shift, set type (unrestricted, restricted set A, or restricted set B), number of contention based preambles per SS/PBCH block, total number of RA preambles, etc.

Following a transmission of a preamble by a WTRU, on a condition that the gNB detects the preamble, the gNB may respond with a RAR. The WTRU may monitor for reception of a RAR. To receive the RAR, the WTRU may assume the same spatial domain receive filter, for example the same receive beam, as for a SS/PBCH block the WTRU used for PRACH association. Monitoring for RAR may include monitoring for a radio network temporary identifier (RNTI), such as a random access RNTI (RA-RNTI). Monitoring for a RNTI may include monitoring for a control channel or DCI masked or scrambled (e.g., with a CRC scrambled) with the RNTI. The control channel or DCI may include the RAR or may be associated with a data channel that may carry the RAR. An RAR may indicate for which transmitted preamble(s) the RAR corresponds or is intended. Multiple RARs, for example, for different transmitted preambles that may have been transmitted by different WTRUs, may be transmitted simultaneously (e.g., in the same control channel or data channel). A RAR may include at least one of: a timing advance (TA) value, a set of resources on which to transmit (e.g., in the UL), and a temporary connection (TC)-RNTI.

The WTRU may determine the RA-RNTI for which to monitor for RAR reception based on the time and/or frequency of the preamble transmission. The RA-RNTI for which the WTRU may monitor may be a function of the time period (e.g., a subframe time period) in which the WTRU began transmission of the preamble. For example, if the WTRU transmitted in subframe 3 of a frame, the RA-RNTI may be 3. The RA-RNTI may be a function of the frequency resource(s) the WTRU used for transmission of the preamble.

If the WTRU does not receive an RAR, using the determined RA-RNTI, indicating the preamble transmitted by the WTRU within the RAR window, the WTRU may send another preamble at a later time. The retransmission at the later time may be sent at a higher power. The higher power may be limited to a maximum power. The WTRU may change the spatial domain transmission filter (i.e., transmit beam, Tx) for the transmission at the later time. If the WTRU changes the spatial domain transmission filter, it does not increase its transmission power and starts with the same power used for previous attempt using a different spatial domain transmission filter.

The WTRU may wait again for receipt of an RAR from the gNB. The sequence of transmitting and waiting may continue until the gNB may respond with an RAR or until the maximum number of random access preamble transmissions have been reached. The gNB may transmit and the WTRU may receive the RAR in response to a single preamble transmission or multiple preamble transmissions.

At least one of the preambles transmitted, at the progressively higher transmit powers, may be detected by the gNB. An RAR may be sent by the gNB in response to at least one of the detected preambles.

When the WTRU receives an RAR that may be intended for it the WTRU may transmit on the indicated resources. The WTRU may apply the indicated TA to its transmission. In some embodiments, the WTRU may apply the indicated TA to its transmission in the UL.

A PRACH preamble may be considered a PRACH resource. For example, PRACH resources may include a PRACH preamble, time, and/or frequency resources.

Hereinafter, the terms RA resources, RACH resources and PRACH resources may be used interchangeably. The terms RA, RACH, and PRACH may be used interchangeably. Also, RA preamble, RA preamble sequence, preamble, preamble sequence, RACH preamble, PRACH preamble may be used interchangeably.

Masked and scrambled may be used interchangeably herein. Masking a control channel or DCI with a RNTI may be the same as masking or scrambling the CRC of the control channel or DCI with the RNTI.

The terms transmit beam and spatial domain transmission filter may be used interchangeably herein. Receive beam and spatial domain receive filter may be used interchangeably herein. RA preamble transmission and MSG1 may be used interchangeably herein. RAR and MSG2 may be used interchangeably herein.

Joint Communication and Sensing is referred to herein as a technology that provides communication devices with RF sensing and Radar capabilities. The RF sensing and Radar capabilities are built on an enhanced communication framework.

5G technologies and systems are designed to also operate in the upper frequency bands, such as in the 28 GHz band. This indicates a convergence of the frequency bands used by different technologies, such as radar and mobile communication systems. Moreover, there has been an uptake in consumer devices with radar sensing capabilities. Given the convergence of the frequency bands between radar and mobile communications and the ubiquity of consumer devices with radar capability, technologies that can jointly handle communications and sensing on the same architecture/platform may be more cost effective and have lower complexity as compared to two independent platforms.

Use of Joint Communication and Sensing capable nodes will enable a broad range of applications, such as: indoor sensing; automotive/V2X, industrial IoT and real time radio; indoor sensing in which nodes may detect and monitor physical activity, which may further be enhanced with activity classification, to classify human movement, posture, fall detection, vitals monitoring (e.g., a heartbeat), intrusion detection and more; Automotive/V2X nodes which may perform simultaneous radar and V2X communications and may also perform real-time updates of the environment and road maps; industrial IoT applications which may comprise a large scale deployment of nodes to enable warehouse indoor localization; and real-time radio-environment maps built using enhanced communication devices.

Radar may refer to radio detection and ranging. RadCOM may refer to joint radar and communication technologies or systems. JCS and RadCOM may be used interchangeably herein. JCS-RS may refer to a Joint Communications and Sensing Reference Signal. A TRP refers to a transmission and reception point such as a gNB or AP. A CSI-RS refers to a channel state information reference signal. An RNTI refers to a Radio Network Temporary Identity, such as a cell RNTI (C-RNTI).

During initial synchronization a WTRU may cycle through its receive beams (i.e., spatial domain reception filters) and may monitor for an SSB transmission on each beam for a monitoring period.

In some embodiments, upon successfully receiving one or more SSB transmissions, the WTRU may choose one SSB based on received signal quality, and may transmit a RACH preamble on the RACH occasion corresponding to the chosen SSB transmission as identified by the SSB Index contained in the SSB. The WTRU may use a transmit beam that corresponds to the receive beam that resulted in the optimum SSB reception. If the WTRU does not receive a response during a RAR window duration, it may transmit the RACH preamble again, by ramping up the transmit power, up to a specified maximum value and potentially using a different spatial domain transmission filter (i.e., transmit beam).

The entire synchronization procedure may incur a significant latency if the WTRU supports a large number of beams and if power ramping is required in multiple steps due to failed RACH preamble reception. Additionally, if the channel conditions for WTRU transmit and receive beams do not share a common set parameters indicating their performance (i.e., the transmit and receive beams are not reciprocal, also referred to as non-correspondence of beams), then finding the right pair of transmit and receive beams may take a longer time. Optimum signal reception for a WTRU by a certain WTRU receive beam may not result in optimum signal quality in the reverse link, when the WTRU uses the WTRU transmit beam that is supposed to be identical to the optimum WTRU receive beam.

At higher frequency bands, such as mmW spectrum bands, where directional transmission and reception are both required and practically feasible, some transmission failures may occur due to transient obstacles interfering with the directional transmit and receive beams. The directional transmit and receive beams may comprise, for example, at the gNB and WTRU in downlink, respectively comprising the communication link. Specifically, a transient obstruction occurring when the WTRU transmits the RACH preamble, and which results in reception failure by the gNB indicated by failure to receive a valid RACH response by the WTRU, may cause the WTRU to retransmit the RACH preamble perhaps using a different WTRU transmit beam, and may correspond to a different SSB Index (gNB transmit beam). If this RACH preamble retransmission results in successful reception by the gNB, followed by RAR and Grant for MSG3 reception by the WTRU, then the WTRU may continue using the second WTRU transmit and receive beams, perhaps corresponding to a second gNB receive and transmit beams, respectively. If, however, the obstruction causing degradation of the optimum beam pair between the gNB and the WTRU was transient in nature, then it may be re-discovered only after the CSI Reporting procedure starts. Even then, it may take several cycles of reporting to re-discover the optimum beam, as each CSI Report contains a subset of measurements. The subset of measurements may comprise at most four WTRU measurements.

A WTRU may perform a JCS/radar-like measurement using its transmission of preamble sequence used to initiate the RACH process. After the transmission of preamble sequence, the WTRU may monitor and estimate the backscatter channel. To make backscatter measurements, the WTRU may perform at least one of: estimating the received power of the backscatter; estimating the phase of the backscatter; estimating the channel impulse response of the backscatter and/or relevant parameters of channel impulse response, such as, round-trip-time, delay spread, path-loss, etc.; performing cross-correlation between the received backscatter and the preamble sequence used for transmission; estimating the angle of arrival of the backscatter, such as, with respect to the angle of departure of the preamble transmission.

In the case of a beam-based system, a WTRU may monitor and measure backscatter on the received beam(s) corresponding to the transmit beam(s) used to transmit the preamble sequence.

In some embodiments, a WTRU may support conditional power ramping. For example, the WTRU may support a RA preamble retransmission window adaptation procedure. In some embodiments, to support a conditional power ramping procedure, a WTRU may be configured to receive a JCS-RS configuration. In some embodiments, the JCS-RS configuration is a JCS backscatter power fraction ($\lambda$) of WTRU transmit Power ($P_{Tx}$), step count multiple (N>1). The WTRU may transmit a RACH preamble in RACH occasion corresponding to preferred SSB Index using an initial WTRU transmit beam. The WTRU may measure the backscatter power ($P_{BS}$) using the WTRU receive beam corresponding to the WTRU transmit beam used for the RACH preamble transmission. On a condition that $P_{BS} > \lambda P_{Tx}$, the WTRU may increase a transmit power for the next RACH preamble transmission by N number of power ramping step sizes for the same WTRU transmit beam.

An absolute JCS backscatter power threshold (T) may be configured, for example, independent of the transmit power. In some embodiments, a WTRU may be configured with multiple JCS backscatter power thresholds and associated step counts, and it may choose a step count depending on the exceeded threshold. The WTRU may be configured with multiple power ramping step sizes, based on the blockage detection determination, and it may choose a different step size to increase the power of the retransmission. Other metrics such as Angle of Arrival (AoA), round-trip delay, Doppler shift, etc. may be included to define the backscatter measurement threshold values.

In some embodiments, a WTRU may be configured with parameters for initial access. The configuration parameters may include at least resources. In further embodiments, the resources may comprise time and frequency resources (i.e., RACH occasions), target power level at the network side, step sizes for power ramping for RA preamble retransmissions, RAR window length, maximum number of preamble transmission, etc.

During initial access, for the JCS measurement using a RA preamble transmission, the WTRU may be configured with, at least, one or more of the following parameters: JCS backscatter power fraction factor ($\lambda$) and Step count (N). The JCS backscatter power fraction factor ($\lambda$), in combination of the transmit power, is used to derive a backscatter measurement threshold to detect blockage in the direction of the preamble transmission. Step count (N) provides the value of number of power ramping steps by the WTRU needs to increase its power in case of blockage detection.

In some embodiments, the configuration may be communicated to the WTRU in RRC configuration or broadcast as system information.

After the transmission of a RA preamble with a transmit power of value $P_{Tx}$, on a RACH occasion (i.e., associated with the chosen SS/PBCH block), the WTRU may monitor and measure the backscatter of the RA preamble transmission. Based on the received backscatter power, the WTRU may determine if there is blockage in the direction of the preamble transmission. The WTRU may determine that a direction is blocked. This may indicate a smaller probability of correct reception of the transmitted preamble at the gNB. For example, the WTRU may determine that a direction is blocked on a condition that the received backscatter power, ($P_{BS}$), is greater than the backscatter measurement threshold. The JCS backscatter measurement threshold may be set as a power fraction of WTRU transmit power, $\lambda P_{Tx}$, which means, on a condition that $P_{BS} > \lambda P_{Tx}$, the WTRU may determine the direction as blocked.

The WTRU may be configured with a fixed threshold (T), independent of the transmit power, to detect the blockage. For example, if the received backscatter power of the transmitted RA preamble ($P_{BS}$) is greater than the configured fixed threshold (i.e., $P_{BS} > T$), then the WTRU may identify it as a blocked antenna configuration.

After transmitting the RA preamble, the WTRU may monitor for a reception of RAR within the RAR window configured to the WTRU. The WTRU may monitor for a RAR by monitoring for a RA-RNTI associated with the RACH occasion, which may include monitoring for a control channel or DCI (e.g., DCI format 1_0) masked or scrambled (e.g., CRC scrambled) with the RA-RNTI in the downlink control channel common search space.

On the condition that the WTRU determines a blockage based on the received backscatter power of the RA preamble and/or the WTRU does not receive a RAR (e.g., using the determined RA-RNTI) indicating the RA preamble reception by the gNB, within the RAR window, the WTRU may retransmit the RACH preamble. For the retransmission, the WTRU may increase the transmit power by N (i.e., the value of the configured step count) number of power ramping steps, where the power ramping step may be a fixed configured value. For example, if an initial RA preamble is transmitted using the transmit power (P) then, after the blockage detection and not receiving an associated RAR within the RAR window, the WTRU uses the transmit power of min (max WTRU power, P+N×power_ramping_step) for the retransmission. The WTRU may use the same WTRU transmit beam for the transmission and the retransmission, or may select a different beam for retransmission.

The WTRU may be configured with multiple power ramping step sizes. On the condition that the WTRU does not determine a blockage based on the received backscatter power of the RA preamble (e.g., transmitted with the power, P), then, if the WTRU does not receive a RAR within the RAR window, the WTRU may increase transmission power of the retransmission by using a first configured step size ($T_1$). In this example, the transmission power of the retransmission would be min (max WTRU power, P+$T_1$). However, on a condition that the WTRU detects a blockage and does not receive a RAR within the RAR window, the WTRU may increase transmission power of the retransmission by using a second configured step size ($T_2$), where, $T_2 > T_1$. In general, the WTRU may determine the power step size based on a combination of measured backscatter power, and a history of previous and current results in detecting an RAR.

Additionally, or alternatively, the WTRU may be configured with multiple JCS backscatter measurement thresholds, such as multiple JCS backscatter power fraction factors ($\lambda_1$, $\lambda_2$, ..., etc.) or multiple fixed backscatter measurement thresholds. For each of the backscatter measurement thresholds, a different value of step count ($N_1$, $N_2$, ..., etc.) or step size ($T_1$, $T_2$, ..., etc.) may be configured. In some embodiments, step count or step size proportional to the measured backscatter power may be used. The WTRU may choose a value of the step count or step size depending on the amount by which the backscatter measurement exceeds the threshold. For example, on a condition that the received backscatter power of the transmitted RA preamble, with transmit power $P_{Tx}$, ($P_{BS}$) is greater than $\lambda_m P_{Tx}$, then the WTRU may select the step count of value $N_m$ or the step size of value $T_m$.

Additionally, or alternatively, the WTRU may be configured with one or multiple threshold values of one or multiple of other backscatter measurement metrics, such as, angle of arrival (AoA), Doppler spread, round-trip-time, phase of the backscatter, etc. The WTRU may be configured to determine the value(s) of the step count(s) or step size(s) by using the configured threshold values of one or multiple of other backscatter measurement metrics, such as, AoA or/and Doppler spread, round-trip-time, phase of the backscatter, etc. The WTRU may determine blockage based on measurement of a collection of sub-bands (e.g., resource elements), over which the RA preamble has been transmitted. Blockage may be determined individually on each sub-band, or on a combination of sub-band determinations.

The WTRU may indicate its RADAR capability/configuration (e.g., range resolution, minimum/maximum ranging distance, target miss detection/false alarm rate, etc.) to the gNB. The gNB may use the WTRU's RADAR capability to configure the backscatter measurement thresholds and/or the associated values of the step counts/step sizes. A WTRU may configure its backscatter thresholds and power ramping step sizes, as determined by a combination of both the WTRU's capability and broadcast system information.

Figure 3:
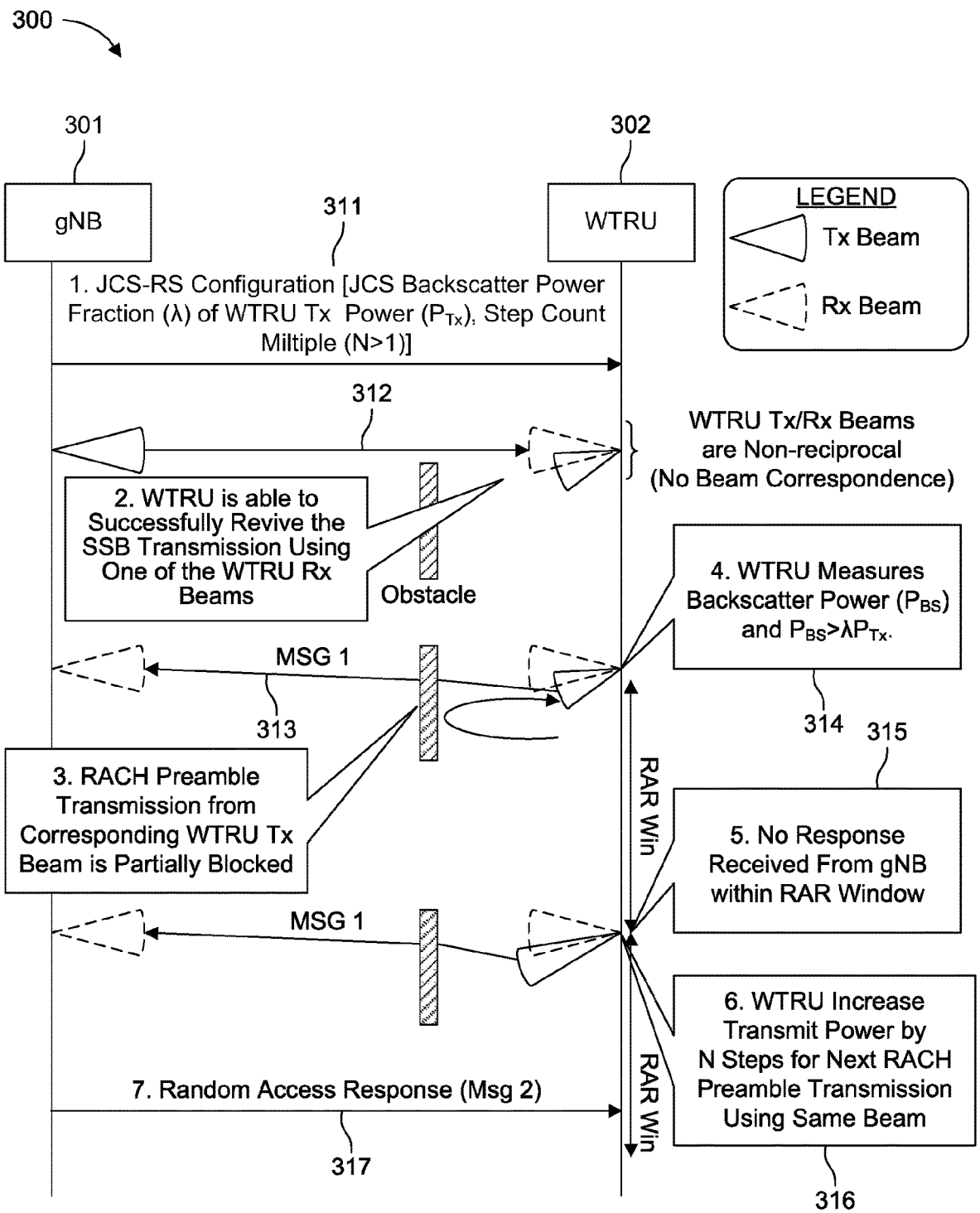
FIG. 3 is a flow diagram illustrating an example of a backscatter measurement based power ramping procedure, according to an embodiment.

FIG. 3 is a flow diagram illustrating a conditional power ramping procedure 300, according to an embodiment. At 311, the WTRU 302 receives a JCS-RS configuration from a gNB 301. In some embodiments, the JCS-RS configuration comprises a JCS backscatter power fraction ($\lambda$) of WTRU transmit power ($P_{Tx}$). In the embodiment illustrated in FIG. 3, the WTRU 302 transmit and receive beams do not share a common set of parameters indicating their performance (i.e., the transmit and receive beams are not reciprocal). At 312, the WTRU 302 may successfully receive one or more SSB transmissions using one of the receive beams. At 313 the WTRU may transmit a RACH preamble from the corresponding transmit beam. At 314, the WTRU 302 may measure a backscatter power. The backscatter power ($P_{BS}$) may be measured using the WTRU receive beam corresponding to the WTRU transmit beam used for the RACH preamble transmission. On a condition that backscatter power is greater than power fraction of WTRU transmit power (i.e., $P_{BS} > \lambda P_{Tx}$), the WTRU may determine the direction as blocked. At 316, on a condition that $P_{BS} > \lambda P_{Tx}$ and no RAR is received within the RAR window for the transmitted RACH preamble, the WTRU may increase transmit power. In some embodiments, the power is increased by the N power ramping steps to transmit another RACH preamble. At 317, the WTRU may receive a RAR within the RAR window for the retransmission.

In some embodiments, a window for random access preamble retransmission may be adapted. The WTRU may receive a JCS-RS configuration comprising a minimum RACH preamble retransmission interval ($T_{ReTx}$). In some embodiments, the JCS-RS configuration is a JCS backscatter power fraction ($\lambda$) of the WTRU transmit power ($P_{Tx}$). The WTRU may transmit a RACH preamble in a RACH occasion corresponding to a preferred SS/PBCH Index using an initial WTRU transmit beam, having an associated first RA-RNTI value. The backscatter power ($P_{BS}$) may be measured using the WTRU receive beam corresponding to the WTRU transmit beam used for the RACH preamble transmission. On a condition that $P_{BS} > \lambda P_{Tx}$, the WTRU may retransmit the RACH preamble after a $T_{ReTx}$ interval, on resources associated with a second RA-RNTI value. The WTRU may be configured for monitoring the PDCCH common search space with the first RA-RNTI and the second RA-RNTI, for respective RAR window intervals.

In some embodiments, a WTRU may be configured with multiple JCS backscatter power thresholds and associated minimum RACH preamble retransmission intervals, and the WTRU may choose one or more retransmission intervals depending on the exceeded threshold. The WTRU may be configured with a RAR window reduction factor (W), and if $P_{BS} > \lambda P_{Tx}$, the WTRU reduces the RAR window by configured fraction (W). The WTRU may be configured with multiple backscatter measurement thresholds (e.g., $\lambda_1, \lambda_2$) to determine either to transmit another preamble after the minimum RA preamble retransmission interval (e.g., when $\lambda_2 P_{Tx} > P_{BS} > \lambda_1 P_{Tx}$) or to reduce the RAR window (e.g., when, $P_{BS} > \lambda_2 P_{Tx}$).

In some embodiments, multiple random access preamble transmissions may be made. A WTRU may be configured with parameters for initial access. The configuration parameters may at least include resources, such as time and frequency resources (i.e., RACH occasions), target power level at the network side, step sizes for power ramping for RA preamble retransmissions, and RAR window length, maximum number of preamble transmission, etc.

In some embodiments, after transmitting a RA preamble, the WTRU may be configured to conditionally transmit multiple RA preambles at different RACH occasions (e.g., at different time resources) based on the backscatter measurements. For example, after transmitting a first RA preamble on a first RACH occasion associated with a first RA-RNTI, the WTRU may transmit a second RA preamble at a second RACH occasion, for example, later than a first RACH occasion, based on the measured backscatter signal parameters corresponding to the first RA preamble transmission. The second RA preamble transmission may occur before an expiration of a RAR window timer associated with the first RA preamble transmission. The second RACH occasion may be associated with a second RA-RNTI. Similarly, based on the backscatter measurements of the second RA preamble transmission, the WTRU may transmit a third RA preamble on a third RACH occasion, later than the second RACH occasion, but before the RAR window associated with the second RA preamble transmission expires, and so on.

In some embodiments, in order to enable multiple RA preamble transmissions, the WTRU may be configured with at least one of the following parameters: JCS backscatter power fraction factor ($\lambda$), minimum RACH preamble retransmission interval ($T_{ReTx}$) and maximum retry attempts (N). These parameters are described herein.

In some embodiments, the JCS backscatter power fraction factor ($\lambda$) is, in combination with the transmit power, used to derive a backscatter measurement power threshold to detect blockage in the direction of the preamble transmission. Minimum RACH preamble retransmission interval ($T_{ReTx}$) defines the minimum time after the WTRU may transmit another preamble within the RAR window of the previous preamble transmission. Maximum retry attempts (N) defines the maximum number of preamble retransmissions allowed using the backscatter measurements. The value of N may be less than the maximum number of preamble transmission allowed by the gNB. In some embodiments, a configuration may be communicated to the WTRU, for example, in RRC configuration or system information.

In some embodiments, after the transmission of the first RA preamble with a transmit power, of value $P_{Tx}$, on the first RACH occasion, for example, associated with the first preferred SS/PBCH block, the WTRU may monitor and measure the backscatter of the first RA preamble transmission. Based on the received backscatter power, the WTRU may determine if there is blockage in the direction of preamble transmission. The WTRU may determine that a direction is blocked, which may indicate a lower probability of correct reception of the transmitted preamble at the gNB when the received backscatter power, ($P_{BS}$), is greater than the backscatter measurement threshold. In some embodiments, the JCS measurement threshold may be set as a power fraction of WTRU transmit power, $\lambda P_{Tx}$, which means, if $P_{BS} > \lambda P_{Tx}$, the WTRU may determine the direction as blocked.

Additionally, or alternatively, the WTRU may be configured with a fixed threshold (T), independent of the transmit power, to detect the blockage. For example, if the received backscatter power of the transmitted RA preamble, ($P_{BS}$), is greater than the configured fixed threshold (i.e., $P_{BS} > T$), then the WTRU may declare it as a blocked direction.

In some embodiments, after the transmission of the first RA preamble, the WTRU may monitor for a reception of a RAR within the RAR window configured to the WTRU. The WTRU may monitor for a RAR of the first RA preamble by monitoring for a RA-RNTI, i.e., first RA-RNTI associated with the first RA preamble transmission. This may include monitoring for a control channel or DCI (e.g., a DCI format 1_0), masked or scrambled with a CRC, with the first RA-RNTI in the downlink control channel common search space.

In some embodiments, on a condition that the WTRU determines a blockage based on the received backscatter power of the first RA preamble and that the WTRU does not receive a RAR for the first RA preamble within the $T_{ReTx}$ time interval, the WTRU may transmit a second RA preamble. Here, the value of $T_{ReTx}$ may be configured lower than the RAR window size of the first RA preamble.

Additionally, or alternatively, the WTRU may be configured with multiple JCS backscatter measurement thresholds, for example, multiple JCS backscatter power fraction factors ($\lambda_1, \lambda_2, \ldots$, etc.) or multiple fixed backscatter measurement thresholds. For each of the backscatter measurement thresholds, a different value of minimum RACH preamble retransmission interval may be configured, ($T_{ReTx\_1}, T_{ReTx\_2}, \ldots$, etc.). In some embodiments, a minimum RACH preamble retransmission interval proportional to the measured backscatter power may be used. The WTRU may choose a value of the minimum RACH preamble retransmission interval depending on the exceeded threshold by the backscatter measurement. For example, if the received backscatter power of the transmitted RA preamble with transmit power $P_{Tx}$ ($P_{BS}$), is greater than $\lambda_m P_{Tx}$, then the WTRU may select the minimum RACH preamble retransmission interval of value $T_{ReTx\_m}$.

Additionally, or alternatively, the WTRU may be configured with one or multiple threshold values of one or multiple of other backscatter measurement metrics, such as, angle of arrival (AoA), Doppler spread, round-trip-time, phase of the backscatter, etc. The WTRU may be configured to determine the value(s) of the minimum RACH preamble retransmission interval(s) by using the configured threshold values of one or multiple of other backscatter measurement metrics, such as AoA or/and Doppler spread, round-trip-time, phase of the backscatter, etc. The WTRU may be configured with multiple values of minimum RACH preamble retransmission intervals associated with multiple threshold values of one or multiple of other backscatter measurement metrics, such as AoA or/and Doppler spread, round-trip-time, phase of the backscatter, etc.

In some embodiments, WTRU may indicate its RADAR capability and/or configuration, such as range resolution, minimum/maximum ranging distance, target miss detection/false alarm rate, etc., to the gNB and/or network. The gNB may use the WTRU's RADAR capability to configure the backscatter measurement thresholds and/or the associated values of the minimum RACH preamble retransmission intervals to the WTRU.

In some embodiments, for the second RA preamble transmission, to derive the RACH occasion (i.e., second RACH occasion), the WTRU may select a different or the same SS/PBCH block used for the first RA preamble transmission. If at the time of the second RA preamble transmission, the WTRU is still monitoring for the reception of RAR of the first RA preamble transmission, the WTRU may select a RACH occasion to transmit the second RA preamble such that the respective RA-RNTI is different from the RA-RNTI used for the first RA preamble transmission. The WTRU may select a different or the same spatial domain transmit filter used for the first RA preamble transmission. For example, the WTRU may use the same SS/PBCH block and the same spatial domain transmit filter used for the first RA preamble transmission, but the WTRU may use a higher power than the power of the first RA preamble transmission, but less than maximum WTRU power.

In some embodiments, when the WTRU transmits the second RA preamble, the WTRU may not stop the RAR window timer of the first RA preamble and may continue monitoring for reception of a RAR associated with the first RA preamble transmission. After the transmission of a second RA preamble, the WTRU may also monitor for reception of an RAR associated with the second RA preamble transmission within the associated RAR window (i.e., corresponding to the second RA preamble) configured to the WTRU. The WTRU may monitor for a RAR of the second RA preamble by monitoring for the second RA-RNTI, which may include monitoring for a control channel or DCI (e.g., DCI format 1_0) masked or scrambled (e.g., with a CRC scrambled) with the second RA-RNTI in the downlink control channel common search space.

In some embodiments, the WTRU may use two spatial domain receive filters to simultaneously monitor for reception of RAR associated with the first and the second RA preambles.

Additionally, or alternatively, the WTRU may be configured with multiple pools of preambles, where each preamble pool is assigned to be used for successive RA preamble transmission attempts. For example, a first preamble pool may be assigned for the first RA preamble transmission attempt, a second preamble pool may be assigned for the second RA preamble transmission attempt after a pre-configured RACH preamble retransmission interval, and so on. The choice of a preamble from the second preamble pool by the UE indicates to the base station that the WTRU has shortened its retransmission interval and that the base station may abandon transmission of the RAR corresponding to the first RA preamble transmission, if it was successfully received.

In some embodiments, upon a condition that the WTRU receives a RAR associated with the first (or second) RA preamble transmission and does not receive a RAR associated with the second (or first) RA preamble transmission within the RAR window of the first RA preamble transmission, the WTRU may stop monitoring further the reception of any RAR associated with the second (or first) RA preamble transmission. The WTRU may apply the timing advance (TA) and transmit the MSG3 on the allocated resources given in the received RAR.

In some embodiments, upon a condition that the WTRU does not receive any RAR associated with either the first or second RA preamble transmissions within the RAR window of the first RA preamble transmission, and if the WTRU receives a RAR associated with the second RA preamble transmission within the RAR window of the second RA preamble transmission, the WTRU may apply the timing advance (TA) and transmit the MSG3 on the allocated resources given in the received RAR.

In some embodiments, upon a condition that the WTRU does not receive any RAR associated with either the first or second RA preamble transmissions before the RAR window timer of the second RA preamble transmission expires, the WTRU may send another preamble at a later time. The transmission at the later time may be at a higher power, but less than maximum WTRU power. Alternately, the WTRU may change the spatial domain transmission filter (i.e., transmit beam) for a retransmission. If the WTRU changes the spatial domain transmission filter, it may not increase its transmission power and may start with the same power used for previous attempt using a different spatial domain transmission filter.

Figure 4:
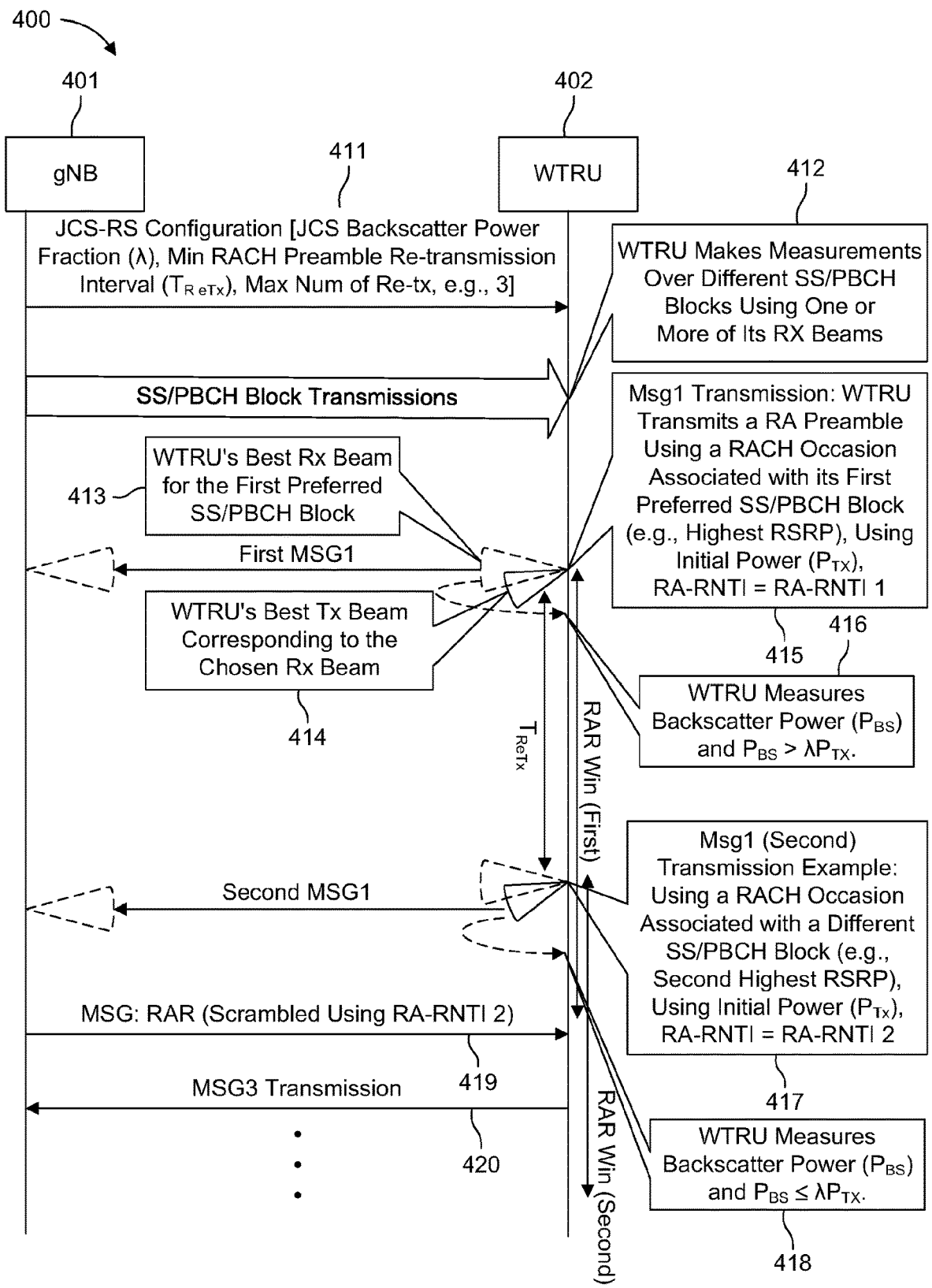
FIG. 4 is a flow diagram illustrating an example of a backscatter measurement based multiple random access channel (RACH) preamble transmissions, according to an embodiment.

FIG. 4 is a flow diagram illustrating a RACH preamble retransmission window adaptation 400, according to an embodiment. At 411, the WTRU 402 may receive a JCS-RS configuration from a gNB 401 comprising a minimum RACH preamble retransmission interval ($T_{ReTx}$). In some embodiments, the JCS-RS configuration is a JCS backscatter power fraction ($\lambda$) of the WTRU transmit Power ($P_{Tx}$). At 412, the WTRU 402 may take measurements over different SS/PBCH blocks using one or more of its receive beams. At 413, the WTRU 402 may determine a preferred SS/PBCH block or SSB index. In some embodiments, this determination is based on a RSRP measurement, where the preferred SS/PBCH block may be the one which is received with the maximum RSRP value. Also at 413, the WTRU 402 may determine a preferred receive beam for the first preferred SS/PBCH block. At 414, the WTRU 402 may determine a preferred transmit beam corresponding to the chosen receive beam. At 415, the WTRU 402 may transmit a RACH preamble using a RACH occasion associated with its first preferred SS/PBCH block using an initial power ($P_{Tx}$). The RACH preamble may use a first RA-RNTI (RA-RNTI 1) to monitor for RAR reception based on the time and/or frequency of the preamble transmission. At 416, the WTRU 402 may measure backscatter power. The backscatter power ($P_{BS}$) may be measured using the WTRU receive beam corresponding to the WTRU transmit beam used for the RACH preamble transmission. If $P_{BS} > \lambda P_{Tx}$, the WTRU 402 may determine that the direction is blocked. At 417, the WTRU 402 may transmit a second RACH preamble after detecting a blockage from the first RACH preamble transmission and not receiving a RAR within the minimum RACH preamble retransmission interval ($T_{ReTx}$). The second RACH preamble may use a RACH occasion associated with a different SS/PBCH block. In some embodiments, the SS/PBCH block may have the second highest RSRP. The second RACH preamble may use the initial power ($P_{Tx}$) and a second RA-RNTI (RA-RNT 2) to monitor for RAR reception. At 418, the WTRU 402 may measure backscatter power. If $P_{BS} \leq \lambda P_{Tx}$, the WTRU 402 may determine the direction as not blocked. The WTRU 402 may receive a RAR for the second RACH preamble transmission within the respective RAR window at 419. The WTRU 402 may then transmit a MSG3 as configured in the RAR message at 420. In some embodiments, after the transmission of second RACH preamble, if the WTRU still detects a blockage using the backscatter measurement of the second RACH preamble, the WTRU may transmit a third RACH preamble if it does not receive any RAR (either for first or second RACH preamble) within the next (i.e., after the transmission of the second RACH preamble) minimum RACH preamble retransmission interval. After the transmission of third RACH preamble, WTRU may also start monitoring for a RAR associated with the third RACH preamble transmission (e.g., associated with the third RA-RNTI value). If at the time of the third RACH preamble transmission, the WTRU is still monitoring for the reception of RAR of the first and/or second RACH preamble transmissions, the WTRU may select a RACH occasion to transmit the third RACH preamble such that the respective RA-RNTI is different from the RA-RNTI or RA-RNTIs used for the first and/or second RACH preamble transmissions. The WTRU may continue this process until it transmits the maximum number of preamble retransmissions (N) allowed using the backscatter measurements.

In some embodiments, for any two RACH preamble transmissions, for which the WTRU may simultaneously monitor for receptions of respective RARs, the WTRU may select the respective RACH occasions such that the values of RA-RNTIs for the two RA preamble transmissions are different.

In some embodiments, once the RAR window timer of the last RA preamble (e.g., Nth RA preamble if with each of the previous N−1 RA preamble transmissions, a blockage is detected and there is no RAR received for any of the N−1 RA preamble transmissions) expires and if the WTRU does not receive any respective RAR, the WTRU may select and transmit another RA preamble using a higher power with the same transmit beam used for the previous transmission, corresponding to the same SS/PBCH block used for the previous transmission, or using the same power used for the previous transmission, but with a different transmit beam corresponding to the same SS/PBCH block, or using the same power but with a different transmit beam corresponding to a different SS/PBCH block.

In some embodiments, the WTRU may wait again for receipt of a RAR from the gNB. The sequence of transmitting and waiting may continue until the gNB may respond with a RAR or until the maximum number of random access preamble transmissions may have been reached.

In some embodiments, a RAR window may be adapted. After transmitting a RA preamble, a WTRU may be configured to reduce the associated RAR window based on the backscatter measurements. In order to enable the RAR window adaptation, the WTRU may be configured with at least one of the following parameters: RAR window reduction factor (R) and JCS backscatter power fraction factor (λ), used to derive a backscatter measurement threshold to detect blockage in the direction of the preamble transmission. In some embodiments, the configuration may be communicated to the WTRU in RRC configuration or system information.

In some embodiments, after the transmission of a RA preamble with a transmit power of value $P_{Tx}$, on a RACH occasion (i.e., associated with the preferred SS/PBCH block), the WTRU may monitor and measure the backscatter of the RA preamble transmission. Based on the received backscatter power, the WTRU may determine if there is a blockage in the direction of preamble transmission. In some embodiments, the WTRU may determine that a direction is blocked, which indicates a smaller probability of correct reception of the transmitted preamble at the gNB, when the received backscatter power ($P_{BS}$), is greater than the backscatter measurement threshold. The JCS backscatter measurement threshold may be set as a power fraction of WTRU transmit power ($\lambda P_{Tx}$). Therefore, if $P_{BS} > \lambda P_{Tx}$, the WTRU may determine the direction as blocked.

Additionally, or alternatively, the WTRU may be configured with a fixed threshold (T), independent of the transmit power, to detect the blockage. For example, if the received backscatter power of the transmitted RA preamble ($P_{BS}$), is greater than the configured fixed threshold (i.e., $P_{BS} > T$), then the WTRU may declare it as a blocked direction.

In some embodiments, on a condition that the WTRU determines a blockage based on received backscatter power of the RA preamble, the WTRU may update the associated RAR window and use the updated value to monitor for reception of a RAR associated with the transmitted RA preamble. The WTRU may update the RAR window by using the configured RAR window reduction factor (R<1). For example, the updated RAR window may be given by R×W, where the W is the default/original value of the RAR window configured to the WTRU.

Additionally, or alternatively, the WTRU may be configured with multiple JCS backscatter measurement thresholds, for example, multiple JCS backscatter power fraction factors ($\lambda_1, \lambda_2, \ldots$, etc.) or multiple fixed backscatter measurement thresholds. For each of the backscatter measurement thresholds, a different value of the RAR window reduction factor may be configured, for example, $R_1, R_2, \ldots$, etc. For example, the RAR window reduction factor proportional to the received backscatter power may be used. The WTRU may choose a value of the RAR window reduction factor depending on the exceeded threshold by the backscatter measurement. For example, if the received backscatter power of the transmitted RA preamble (with transmit power $P_{Tx}$) ($P_{BS}$), is greater than $\lambda_m P_{Tx}$, then the WTRU may select the RAR window reduction factor of value $R_m$.

In some embodiments, the WTRU may be configured with one or multiple threshold values of one or multiple of other backscatter measurement metrics, such as, AoA, Doppler spread, round-trip-time, phase of the backscatter, etc. The WTRU may be configured to determine the value(s) of the RAR window reduction factor(s) by using the configured threshold values of one or multiple of other backscatter measurement metrics, for example, AoA or/and Doppler spread, round-trip-time, phase of the backscatter, etc. The WTRU may be configured with multiple values of the RAR window reduction factors associated with multiple threshold values of one or multiple of other backscatter measurement metrics, such as AoA or/and Doppler spread, round-trip-time, phase of the backscatter, etc.

In some embodiments, if the WTRU does not receive a RAR indicating the RA preamble transmitted by the WTRU within the updated RAR window (for example, R×W), the WTRU may send another preamble at a later time.

Figure 5:
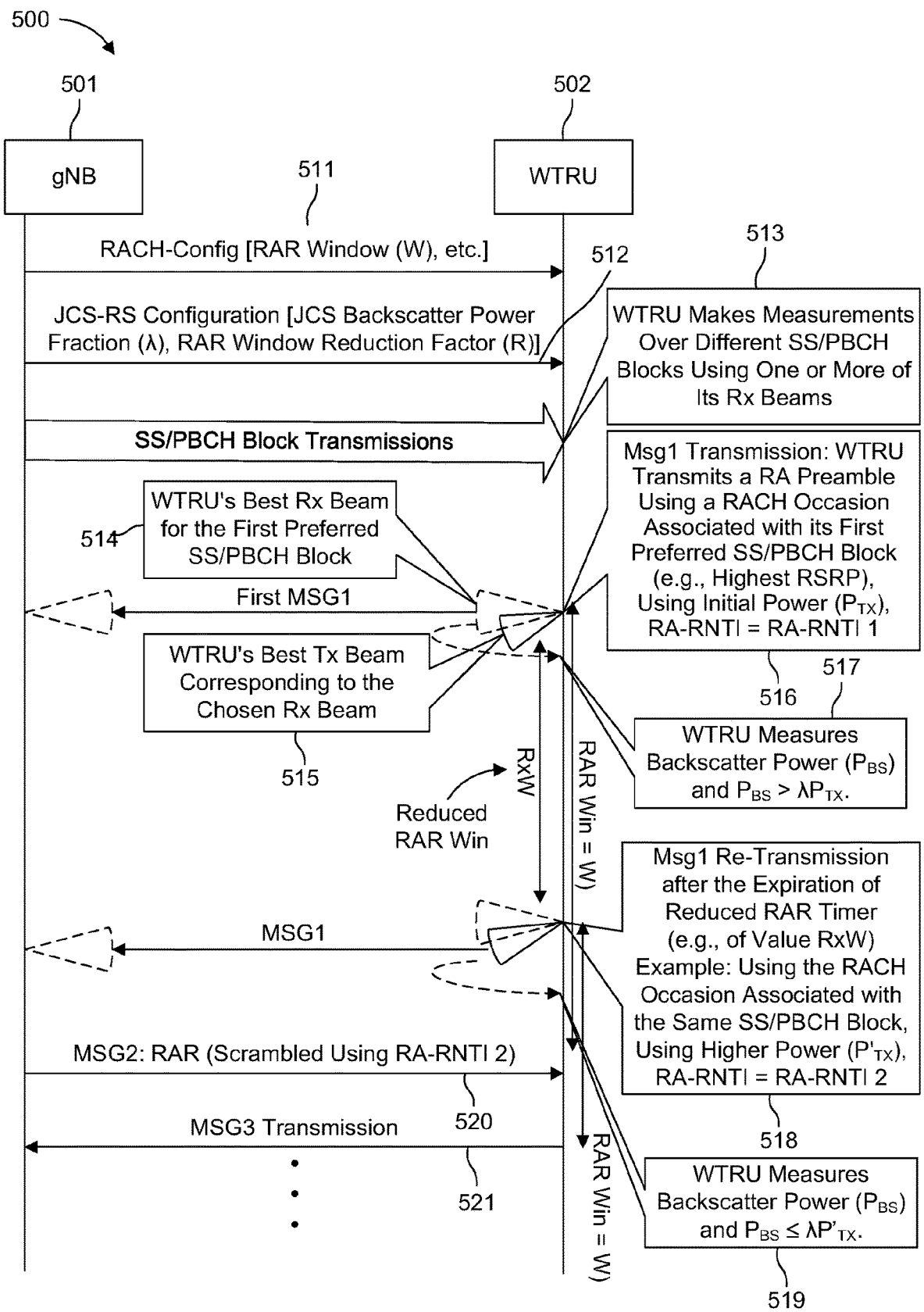
FIG. 5 is a flow diagram illustrating an example of a backscatter measurement based random access response (RAR) window adaptation, according to an embodiment.

FIG. 5 is a flow diagram illustrating a RAR window adaptation 500, according to an embodiment. At 511, the WTRU 502 may be configured with a RAR window (W). At 512, the WTRU 502 may receive a JCS-RS configuration from the gNB 501. In some embodiments, the JCS-RS configuration is a JCS backscatter power fraction (λ) of the WTRU transmit power ($P_{Tx}$). The JCS-RS configuration may contain a RAR window reduction factor (R). At 513, the WTRU 502 may take measurements over different SS/PBCH blocks using one or more of its receive beams. At 514, the WTRU 502 may determine a preferred SS/PBCH block or SSB index. In some embodiments, this determination is based on RSRP measurement, where the preferred SS/PBCH block may be the one which is received with the maximum RSRP value. Also, at 514, the WTRU 502 may determine a preferred receive beam for the first preferred SS/PBCH block. At 515, the WTRU 502 determine a preferred transmit beam corresponding to the chosen receive beam. At 516, the WTRU 502 may transmit a RACH preamble using a RACH occasion associated with its first preferred SS/PBCH block using an initial power ($P_{Tx}$). The RACH preamble may use a first RA-RNTI (RA-RNTI 1) to monitor for RAR reception based on the time and/or frequency of the preamble transmission. At 517, the WTRU 502 may measure backscatter power. The backscatter power ($P_{BS}$) may be measured using the WTRU receive beam corresponding to the WTRU transmit beam used for the RACH preamble transmission. If $P_{BS} > \lambda P_{Tx}$, the WTRU 502 may determine that the direction is blocked. Upon detecting blockage from the RACH preamble transmission, the WTRU 502 may update the RAR window. In some embodiments, the RAR window is reduced. At 518, the WTRU 502 may retransmit the RACH preamble after the expiration of a RAR timer with a value of the updated RAR window. The retransmission may use the initial power ($P_{Tx}$) and a second RA-RNTI (RA-RNT 2). At 519, the WTRU 502 measures the backscatter power $P_{BS}$. If $P_{BS} \leq \lambda P_{Tx}$, the WTRU 502 may determine that the direction is not blocked. Upon the WTRU 502 not detecting a blockage for the retransmission at 518, it may use the RAR window (W), which may be a default value configured to the WTRU, to monitor for the reception of a RAR for the retransmission. At 520, the WTRU 502 may receive a RAR within the RAR window (W) and then transmit a MSG3 as configured in the RAR message at 521.

In some embodiments, switching between multiple RA preamble transmissions and RAR window adaptation may be backscatter measurement based. A WTRU may be configured with multiple backscatter measurement thresholds to determine either to transmit another preamble after the minimum RA preamble retransmission interval or to reduce the RAR window.

In some embodiments, after the transmission of a RA preamble with a transmit power ($P_{Tx}$) on a RACH occasion (i.e., associated with the preferred SS/PBCH block), the WTRU may monitor and measure the backscatter of the RA preamble transmission. On a condition that the received backscatter power, ($P_{BS}$), is greater than the first backscatter measurement threshold, but below the second threshold (e.g., $\lambda_2 P_{Tx} \geq P_{BS} > \lambda_1 P_{Tx}$ or in case of fixed threshold configuration, $T_2 \geq P_{BS} > T_1$), the WTRU may decide to transmit another preamble after the configured minimum RA preamble retransmission interval ($T_{ReTx}$). Based on that decision, if the WTRU does not receive a RAR for the transmitted first RA preamble within the $T_{ReTx}$ time interval, the WTRU may transmit a second RA preamble. The WTRU may keep monitoring for reception of both RARs within the respective RAR windows.

In some embodiments, if the received backscatter power ($P_{BS}$), is greater than the second backscatter measurement threshold ($P_{BS} > \lambda_2 P_{Tx} > \lambda_1 P_{Tx}$ or in case of fixed threshold configuration, $P_{BS} > T_2 > T_1$), the WTRU may decide to reduce RAR window by using the configured RAR window reduction factor (R) and use the reduced RAR window for monitoring for reception of a RAR associated with the transmitted RA preamble.

Additionally, or alternatively, the WTRU may be configured with one or multiple threshold values of one or multiple of other backscatter measurement metrics, such as, AoA, Doppler spread, round-trip-time, phase of the backscatter, etc. The WTRU may be configured to determine either to transmit another preamble after the minimum RA preamble retransmission interval or to reduce the RAR window using the configured threshold values of one or multiple of other backscatter measurement metrics, for example, AoA or/and Doppler spread, round-trip-time, phase of the backscatter, etc. The WTRU may be configured with multiple values of minimum RA preamble retransmission intervals and multiple values of the RAR window reduction factors associated with multiple threshold values of one or multiple of other backscatter measurement metrics, such as AoA or/and Doppler spread, round-trip-time, phase of the backscatter, etc.

In some embodiments, any two RA preamble transmissions, for which the WTRU may simultaneously monitor for receptions of respective RARs, the WTRU may select the respective RACH occasions such that the values of RA-RNTIs for the two RA preamble transmissions are different.

Figure 6:
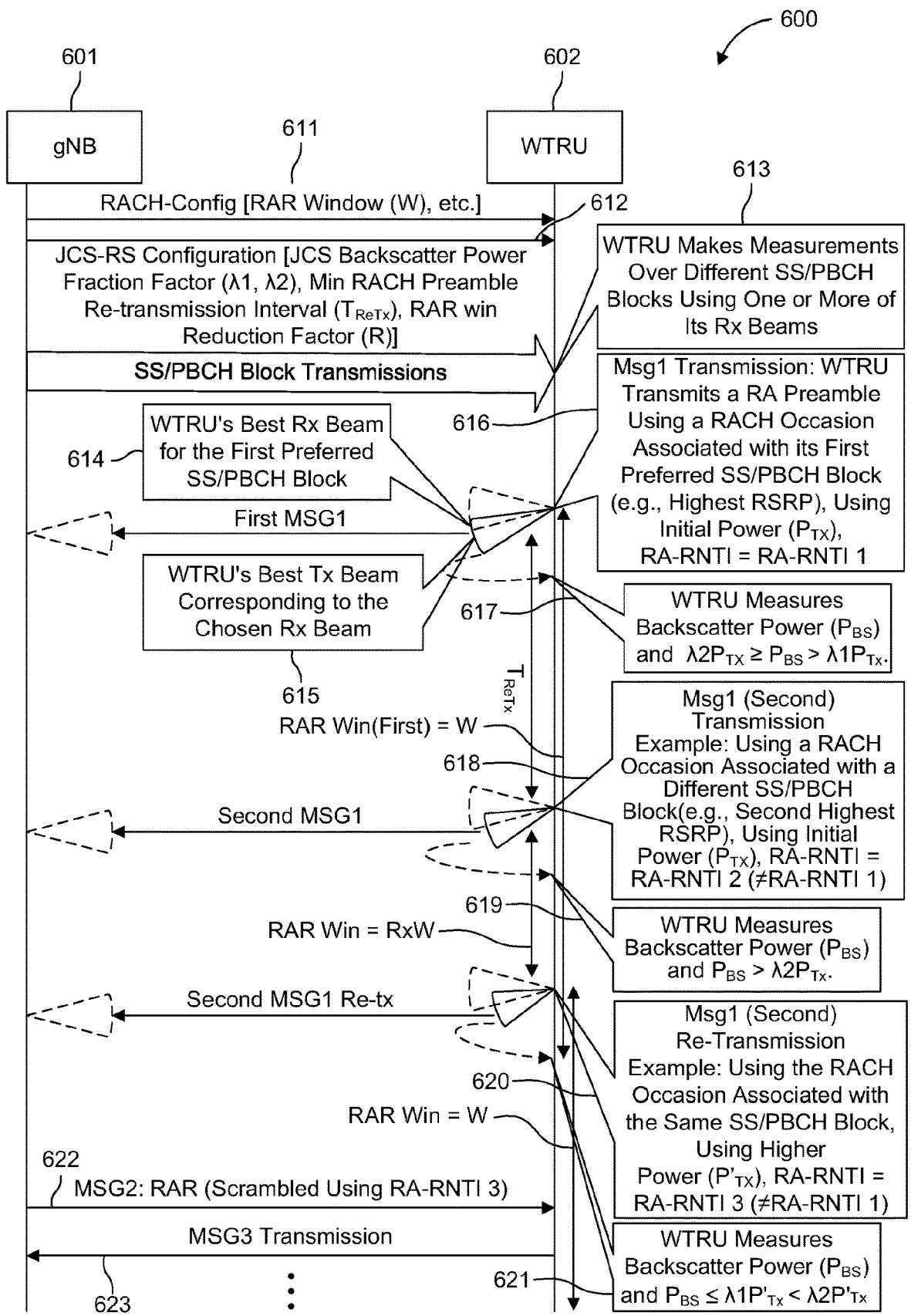
FIG. 6 is a flow diagram illustrating an example of backscatter measurement based switching between multiple RA preamble transmissions and RAR window adaptation, according to an embodiment.

FIG. 6 illustrates a flow diagram of a backscatter measurement based switching between multiple RA preamble transmissions and RAR window adaptation 600, according to an embodiment. At 611, the WTRU 602 may be configured with a RAR window (W). At 612, the WTRU 602 may receive a JCS-RS configuration from the gNB 601. In some embodiments, the JCS-RS configuration is a JCS backscatter power fraction factor ($\lambda 1$, $\lambda 2$) of the WTRU transmit power ($P_{Tx}$). The JCS-RS configuration may contain a RAR window reduction factor (R). The JCS-RS configuration may comprise a minimum RACH preamble retransmission interval ($T_{ReTx}$). At 613, the WTRU 602 may take measurements over different SS/PBCH blocks using one or more of its receive beams. At 614, the WTRU 602 may determine a preferred SS/PBCH block or SSB index. In some embodiments, this determination is based on RSRP measurement, where the preferred SS/PBCH block may be the one which is received with the maximum RSRP value. Also at 614, the WTRU 602 may determine a preferred receive beam for the first preferred SS/PBCH block. At 615, the WTRU 602 determines a preferred transmit beam corresponding to the chosen receive beam. At 616, the WTRU 602 may transmit a RACH preamble using a RACH occasion associated with its first preferred SS/PBCH block using an initial power ($P_{Tx}$). The RACH preamble may use a first RA-RNTI (RA-RNTI 1) to monitor for RAR reception based on the time and/or frequency of the preamble transmission. At 617, the WTRU 602 may measure backscatter power. The backscatter power ($P_{BS}$) may be measured using the WTRU receive beam corresponding to the WTRU transmit beam used for the RACH preamble transmission. If $\lambda_2 P_{Tx} \geq P_{BS} > \lambda_1 P_{Tx}$, the WTRU 602 may determine that there is a blockage. Upon detecting blockage from the RACH preamble transmission, and because the received backscatter power is measured between the first and second backscatter measurement thresholds, the WTRU 602 may transmit a second RA preamble after not receiving a RAR within the minimum RACH preamble retransmission interval at 618. In some embodiments, since the WTRU 602 may monitor for RARs for both the first and second RA preamble transmissions, the WTRU 602 may choose a RACH occasion for the second RA preamble such that the second RA-RNTI (RA-RNT 2) is different from the first RA-RNTI (RA-RNTI 1) of the first RA preamble. In the embodiment illustrated in FIG. 6, the WTRU 602 may measure backscatter power associated with the second RA preamble transmission at 619. If $P_{BS} > \lambda_2 P_{Tx}$, the WTRU 602 may determine that there is a blockage. Since for the second RA preamble transmission, the received backscatter is above the second backscatter measurement threshold, the WTRU 602 uses a reduced value of the RAR window for monitoring the reception of the RAR for the second RACH preamble transmission. After not receiving a RAR either for the first preamble transmission or for the second preamble transmission, at 620, the WTRU 602 attempts to transmit a third RACH preamble after the expiration of the reduced RAR window of the second RACH preamble transmission. During the third RACH preamble transmission, since the WTRU 602 is still monitoring for reception of a RAR for the first RACH preamble transmission, the WTRU may use a different RA-RNTI (RA-RNTI-3) for the third RA preamble transmission compared to the first RA-RNTI (RA-RNTI 1) used for the first RA preamble transmission. At 621, the WTRU 602 may measure the backscatter power. If $P_{BS} \leq \lambda_1 P'_{Tx} < \lambda_2 P'_{Tx}$, the WTRU 602 may determine that the direction is not blocked. For the third RA preamble transmission, because of the received backscatter power is below than the first backscatter measurement threshold, the WTRU 602 neither changes the RAR window nor uses the minimum RA preamble retransmission interval to transmit another preamble. After the transmission of third RA preamble, the WTRU 602 receives a RAR within the RAR window (W) at 622. At 623, the WTRU 602 transmits a MSG3 as configured in the received RAR message.

In some embodiments, a preferred beam may be indicated. A method performed by a WTRU to support RACH procedure may comprise receiving a JCS-RS configuration, such as a JCS backscatter power fraction (λ) of a WTRU's transmit power ($P_{Tx}$), and a RACH preamble pool per SSB Index. The WTRU may transmit a RACH preamble in a RACH occasion corresponding to a preferred SSB index using a first WTRU transmit beam. The WTRU may start a RAR window timer. The backscatter power ($P_{BS}$) may be measured using the WTRU receive beam corresponding to the first WTRU transmit beam. On a condition that the RAR window timer expires and ($P_{BS} > \lambda P_{Tx}$), the WTRU selects one preamble from a pool of preambles used to indicate that the first gNB transmit beam is the preferred bream and sends the RACH preamble in RACH occasion corresponding to next best SSB Index, using a second WTRU transmit beam. The selection of the preamble from a pool of preambles by the WTRU may be random. The method may comprise monitoring for MSG2 (RAR) using the first WTRU receive beam. On a condition that MSG2 (RAR) reception using first WTRU receive beam is not successful, the WTRU attempts to receive MSG2 (RAR) using the second WTRU receive beam. On a condition that MSG2 (RAR) reception using second WTRU receive beam is successful, the WTRU responds with MSG3 transmission using the corresponding second WTRU transmit beam.

The WTRU may indicate a preferred gNB transmit beam identity using a payload following a regular RACH preamble. There may be different window lengths configured for MSG2 (RAR) reception using the first and second WTRU receive beams.

A preferred beam indication may be made using multiple preamble pools. A WTRU may be configured with parameters for initial access. This may include resources, such as time and frequency resources (i.e., RACH occasions), target power level at the network side and step sizes for power ramping for RACH preamble retransmissions, RAR window length, maximum number of preamble transmission and a common RACH preamble pool when no preferred beam indication is required).

The WTRU may be configured for JCS measurements with one or more of the following parameters: JCS backscatter power fraction factor (λ), which in combination with the actual transmit power (Pr), may give the power threshold indicating blockage; power margin ($P_{Margin}$), which may be a minimum observed signal quality difference relative to the preferred beam for a beam to be considered as an alternate beam, which may be specified as a difference between observed RSRPs for the preferred and alternate beams, in dB; max monitoring duration ($T_{Observe}$) which may be the amount of time following RACH preamble transmission when the WTRU monitors using the receive beam for backscatter signal; and special RACH preamble pools per SSB Index in which, or each active SSB-Index (i.e., beam), a special preamble pool may be specified. A special preamble pool may have one or more preamble indexes. When the WTRU does not indicate a preferred beam, it may not use a preamble belonging to a special pool. Alternately, a WTRU may select a preamble from the common as well as the special pool corresponding to the used RACH occasion even when no preferred beam is indicated. The WTRU selection may be random. The choice may be configured to the WTRU. The pool configuration may be communicated to the WTRU, for example, in RRC configuration or system information.

During initial synchronization, the WTRU may monitor one or more SSB transmissions using one or more of its available receive beams. At the end of the monitoring cycle using all of the receive beams, the WTRU may select one gNB transmit beam and WTRU receive beam pair and may identify this as the preferred beam pair. In some embodiments, the WTRU may make this determination based on the observed channel quality (e.g., RSRP) and choose the beam pair that maximizes this metric.

Additionally, or alternatively, the WTRU may identify a gNB transmit beam and a WTRU receive beam pair as an alternate beam pair. In some embodiments, the WTRU may make this determination based on the observed channel quality (e.g., RSRP) and choose the beam pair that results in the next highest value for the chosen metric.

The WTRU may transmit a RACH preamble from the common pool on identified RACH occasion corresponding to the preferred SSB Index (i.e., beam). Depending on when the WTRU sends the RACH preamble (i.e., frame, subframe/slot number, etc.), an RA-RNTI value is implicitly chosen or identified. In some embodiments, the RACH preamble may be chosen randomly.

While transmitting the RACH preamble and for a duration of $T_{Observe}$ afterwards, the WTRU may monitor the corresponding receive beam for backscatter signal. The WTRU may perform one or more of the following operations: energy detection, matched filtering, etc. while monitoring the receive beam.

Immediately after transmitting the RACH preamble, the WTRU may start a RAR window timer and may monitor the PDCCH for DCI scrambled with its RA-RNTI corresponding to the chosen RACH occasion.

If no DCI scrambled with the RA-RNTI corresponding to the chosen RACH occasion is received before the RAR window timer runs out (i.e., expires), and if the observed backscatter power on the receive beam exceeds the configured threshold ($P_{BS} > \lambda P_{Tx}$), at one or more time instants within $T_{Observe}$ duration after preamble transmission, then the WTRU may abandon the current preferred beam and may activate the alternate beam.

The WTRU may then identify the RACH occasion (i.e., time-frequency resources), associated with the alternate beam (i.e., SSB Index). The WTRU may then identify a RACH preamble from the special pool of preambles associated with the preferred beam (i.e., SSB Index). In some embodiments, the RACH preamble is identified randomly by the WTRU. In some embodiments, the WTRU may transmit the RACH preamble associated with the preferred beam on the RACH occasion associated with the alternate beam, e.g. to signal the preferred beam pair to the gNB.

In some embodiments, the WTRU may identify the RACH occasion corresponding to the preferred beam (i.e., SSB Index), and may identify a RACH preamble from the special preamble pool corresponding to the alternate beam (i.e., SSB Index). The WTRU may transmit the chosen RACH preamble corresponding to the alternate beam on the RACH occasion corresponding to the preferred beam.

The WTRU may then start a RAR window timer and may monitor the PDCCH for DCI scrambled with the RA-RNTI associated with the RACH occasion used for actual RACH preamble transmission (i.e., alternate SSB Index or beam). The WTRU may use the receive beam associated with the preferred beam to monitor for the DCI transmission.

On a condition that the WTRU detects a DCI scrambled with the WTRU's chosen RA-RNTI, the WTRU may use the corresponding transmit beam associated with the preferred beam to transmit MSG3 of the RACH procedure in the resources indicated in the RAR message.

On a condition that no DCI scrambled with the WTRU's chosen RA-RNTI is received before the RAR window timer runs out (i.e., expires), the WTRU may switch to the alternate beam and may continue to monitor the PDCCH for DCI scrambled with the WTRU's chosen RA-RNTI. The WTRU simultaneously starts a new RAR window timer for the new monitoring period.

If the WTRU detects a DCI scrambled with the WTRU's chosen RA-RNTI, then the WTRU may use the corresponding transmit beam associated with the alternate beam to transmit MSG3 of the RACH procedure in the resources indicated in the RAR message.

Figure 7:
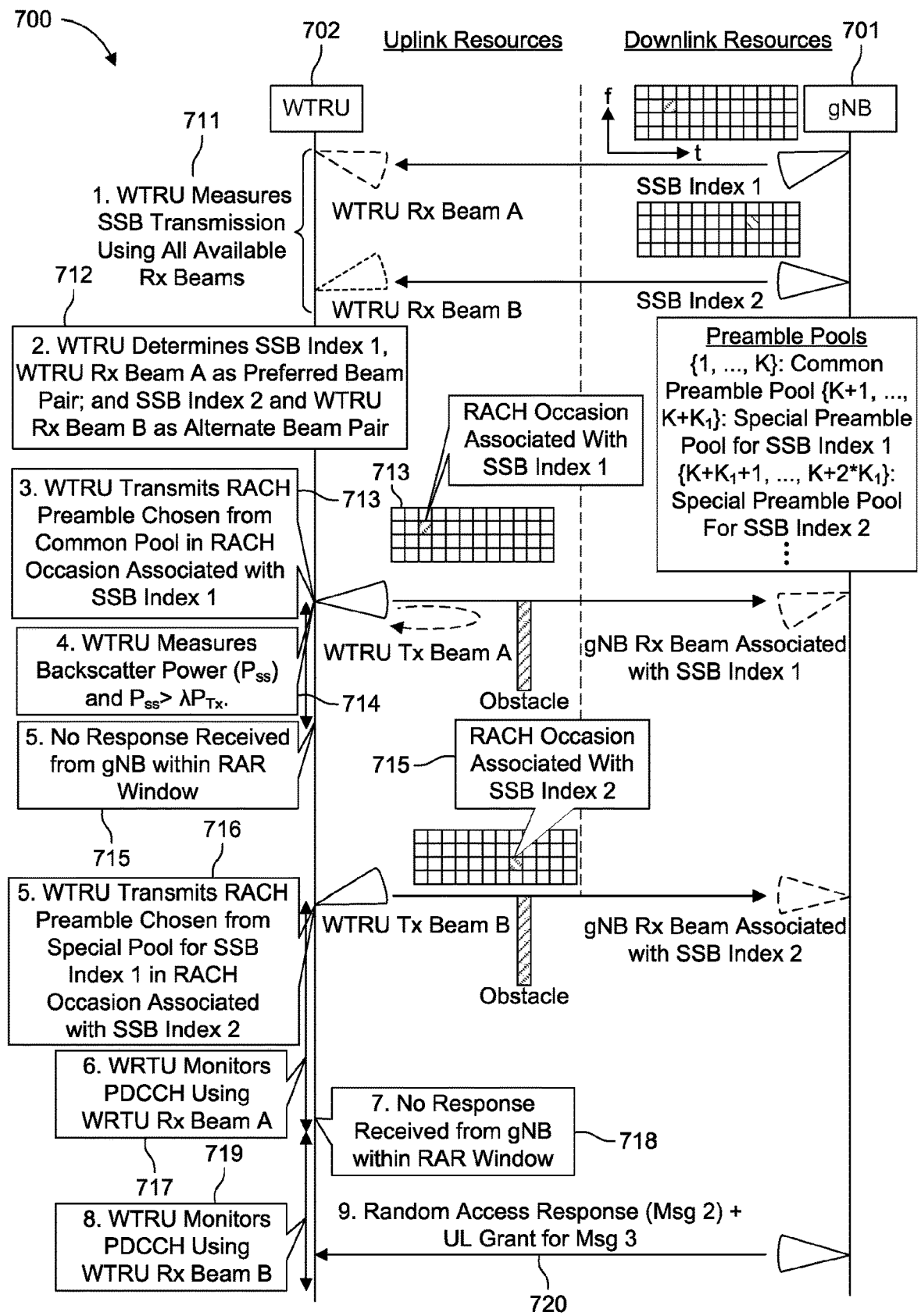
FIG. 7 a flow diagram illustrating an example of preferred beam indication procedure, according to an embodiment.

FIG. 7 illustrates a flow diagram of a preferred beam indication procedure 700, according to an embodiment. At 711, the WTRU 702 may take measurements over different SS/PBCH blocks using all available receive beams. At 712, the WTRU 702 determines a preferred beam pair. In the embodiment illustrated in FIG. 7, SSB Index 1 and UE receive beam A are the determined preferred beam pair. At 712, the WTRU 702 also determines an alternate beam pair. In the embodiment illustrated in FIG. 7, SSB Index 2 and Receive Beam B are the determined alternate beam pair. The determination may be based on measurements taken on SSB transmissions. At 713, the WTRU 702 may first transmit the RACH preamble chosen from a common preamble pool in the RACH occasion associated with the preferred beam pair (SSB Index 1/Receive Beam A). At 714, the WTRU 702 measures the backscatter power. If the backscatter power exceeds the specified fraction of the transmit power ($P_{BS} > \lambda P_{Tx}$), the WTRU 702 may determine that the direction is blocked. Upon the WTRU 702 observing a backscatter power exceeding a configured threshold and the WTRU 702 does not receive a response before the RAR window timer expires 715, the WTRU 702 may send a RACH preamble chosen from the special pool associated with the preferred beam pair (SSB Index 1), in the RACH occasion associated with the alternate beam pair (SSB Index 2) at 716. At 717, the WTRU 702 monitors the PDCCH for DCI scrambled with the chosen RA-RNTI using preferred beam (receive beam A). If no response is received from gNB 701 within the RAR window at 718, the WTRU 702 may switch to the alternate beam (receive beam B) at 719 to monitor the PDCCH. At 720, the gNB 702 transmits the RAR (Msg2) and an UL grant for Msg3.

In some embodiments, a preferred beam may be indicated using a payload. The WTRU may be configured with special RACH occasions (i.e., resources to transmit an SSB Index or beam identifier) following the RACH preamble. The WTRU may be additionally configured with regular RACH occasions (i.e., resources for regular RACH preamble transmissions). In some embodiments, the WTRU may be configured using a SIB.

In some embodiments, the repetition periodicities of the special RACH occasions and the regular RACH occasions may be different. For example, the special RACH occasions may occur less frequently than the regular RACH occasions. Alternately, the locations of the special RACH occasions and the regular RACH occasions may be the same. For example, the locations of the special RACH occasions and the regular RACH occasions may have the same start times. The WTRU may then choose either the special RACH occasion or the regular RACH occasion depending on its requirements.

In some embodiments, the WTRU may transmit a RACH preamble using the preferred WTRU transmit beam in the regular RACH occasion corresponding to the SSB Index of the preferred gNB transmit beam. In some embodiments, the WTRU may choose the RACH preamble randomly. The WTRU may determine the RA-RNTI value corresponding to the chosen RACH occasion.

In some embodiments, while transmitting the RACH preamble and for a duration of $T_{Observe}$ afterwards, the WTRU may monitor the corresponding receive beam for backscatter signal.

In some embodiments, immediately after transmitting the RACH preamble, the WTRU may start a RAR window timer and may monitor the PDCCH for DCI scrambled with the RA-RNTI corresponding to the chosen RACH occasion.

In some embodiments, on a condition that no DCI scrambled with the RA-RNTI corresponding to the WTRU's chosen RACH occasion is received before the RAR window timer runs out (i.e., expires), and if the observed backscatter power on the receive beam exceeds the configured threshold ($P_{BS} > \lambda P_{Tx}$), at one or more time instants within $T_{Observe}$ duration after preamble transmission, then the WTRU may abandon the general RACH occasion resources and may switch to the special RACH occasion resources.

In some embodiments, the WTRU may identify a RACH preamble and may append to it a preferred beam indicator field. In some embodiments, the WTRU identifies the RACH preamble randomly. This field may include a beam identifier (SSB Index) and may utilize a robust encoding and modulation format similar to the PDCCH. The WTRU may then transmit the combined RACH preamble and preferred beam indicator (i.e., SSB Index), on the special RACH occasion associated with the alternate beam.

In some embodiments, the WTRU may include the complete value of the identifier for the preferred beam (i.e., SSB Index in the appended field). Alternately, the WTRU may use a value to indicate the relative value of the preferred beam identifier (i.e., SSB Index), with respect to the alternate beam identifier (i.e., SSB Index). In some embodiments, the signaled value may indicate that the preferred beam is the next value in a numbered order relative to the alternate beam identifier (i.e., SSB Index).

In some embodiments, the RAR window lengths may be configured for preferred beam indication and alternate beam indication, respectively. In some embodiments, the WTRU may be configured with a smaller RAR window length to monitor DCI scrambled with chosen RA-RNTI using the preferred WTRU receive beam, and a larger RAR window length to monitor DCI scrambled with chosen RA-RNTI using the alternate WTRU receive beam.

Upon determining a preferred beam and an alternate beam, the WTRU may first transmit a RACH preamble in the RACH occasion corresponding to the preferred beam (i.e., SSB Index). However, the RACH preamble is chosen from the special pool corresponding to the SSB Index for the alternate beam. In some embodiments, the WTRU chooses the RACH preamble randomly. Alternatively, the WTRU may transmit a RACH preamble in the RACH occasion corresponding the alternate beam (i.e., SSB Index). Then, the WTRU chooses a RACH preamble from the special pool corresponding to the preferred beam (i.e., SSB Index). In some embodiments, the WTRU chooses the RACH preamble randomly. In some embodiments, the choice of the indication method may be previously configured to the WTRU in a SIB or RRC message.

In some embodiments, the WTRU may then monitor the common PDCCH for DCI scrambled with the chosen RA-RNTI using the preferred beam for a configured first RAR window length. On a condition that no DCI scrambled with the WTRU's chosen RA-RNTI is received before the first RAR window timer runs out (i.e., expires), the WTRU may start monitoring the common PDCCH for DCI scrambled with the chosen RA-RNTI for an additional duration of second RAR window length. The WTRU may be configured with the different RAR window lengths, for example as part of the SIB transmissions.

In some embodiments, a method for variable RA preamble length transmissions may be performed by a WTRU. The method may comprise receiving a JCS-RS configuration, such as a JCS backscatter power fraction ($\lambda$) of the WTRU transmit Power ($P_{Tx}$) and resources for short and long RACH preambles. The WTRU may transmit a short RACH preamble in RACH occasion corresponding to preferred SSB Index using an initial WTRU transmit beam. The WTRU may measure the backscatter power ($P_{BS}$) using the WTRU receive beam corresponding to the WTRU transmit beam used for the RACH preamble transmission. On a condition that $P_{BS} > \lambda P_{Tx}$ and the WTRU has reached max transmit power limit for all candidate WTRU transmit beams, the WTRU may transmit a long RACH preamble in a long RACH occasion corresponding to chosen SSB Index.

In some embodiments, the WTRU may be configured with multiple JCS backscatter power thresholds, each with an associated set of RA preambles and a set of RACH occasions, and the WTRU chooses a set of RA-preambles and the associated RACH occasion depending on the exceeded threshold. In some embodiments, each set has RA preambles with a different length.

In some embodiments, the WTRU may be configured with parameters for initial access. The configuration parameters may include at least: target power level at the network side, step sizes for power ramping for RA preamble retransmissions, RAR window length, resources, such as time and frequency resources (i.e., RACH occasions), maximum number of preamble transmissions, etc.

In some embodiments, the WTRU may be configured with multiple sets of RA preamble lengths. The WTRU may be configured multiple sets of RACH occasions, where each set of RACH occasions may be associated with a different RA preamble length. Each set of RACH occasions may have resources, such as time and frequency resources (i.e., RACH occasions), corresponding to one or more SS/PBCH blocks. In some embodiments, a first set of RACH occasions, which are to be used to send RA preambles with first length (e.g., short RACH preambles), may occur more often than a second set of RACH occasions, for RA preambles with second length (e.g., long RACH preambles), where the second length may be larger than the first length.

In some embodiments, a first set of RACH occasions may have an occurrence or repetition frequency such as every N1 time periods. A second set of RACH occasions may have an occurrence or repetition frequency such as every N2 time periods. RACH occasions from the first set may occur or repeat more often than RACH occasions of the second set (e.g., N1 may be less than N2).

In some embodiments, the WTRU may be configured with a JCS backscatter power fraction factor ($\lambda$), which in combination of the transmit power, may be used to derive a backscatter measurement threshold to detect blockage in the direction of the preamble transmission.

In some embodiments, during initial access, the WTRU monitors SS/PBCH transmissions using each of its available receive beams. At the end of the monitoring cycle using all of the receive beams, the WTRU selects one gNB transmit beam/WTRU receive beam pair and identifies this as the preferred beam. In some embodiments, the WTRU may make this determination based on the observed channel quality (e.g., RSRP) and choose the beam pair that maximizes this metric.

In some embodiments, after the determination of the preferred SS/PBCH block, and the corresponding preferred WTRU receive beam, the WTRU may select a RACH occasion from the first set of the RACH occasions corresponding to the preferred SS/PBCH block. The WTRU may select a RA preamble to send over the selected RACH occasion belonging to the first set (e.g., short RACH occasion). The WTRU may select the RA preamble randomly.

In some embodiments, while transmitting a RA preamble, the WTRU may monitor the corresponding receive beam for backscatter signals. The WTRU may perform one of multiple operations such as energy detection, matched filtering, etc. while monitoring the receive beam.

In some embodiments, after transmitting the RA preamble, the WTRU may monitor for a reception of RAR within the RAR window configured to the WTRU. The WTRU may monitor for a RAR by monitoring for a RA-RNTI associated with the RA preamble transmission, which may include monitoring for a control channel or DCI (e.g., DCI format 1_0) masked or scrambled (e.g., with a CRC) with the RA-RNTI in the downlink control channel common search space.

On a condition that the WTRU does not receive a RAR indicating the preamble transmitted by the WTRU within the RAR window, the WTRU may send another RA preamble of a first length at a later RACH occasion chosen from the associated set (e.g., a first set) of the RACH occasions. In some embodiments, the first length may be a short length. The transmission at a later RACH occasion chosen from the associated set (e.g., the first set) of the RACH occasions, may be using a higher power with the same WTRU transmit beam used for the previous transmission corresponding to the same SS/PBCH block used for the previous transmission, or using the same power used for the previous transmission, but with a different transmit beam corresponding to the same SS/PBCH block, or using the same power but with a different transmit beam corresponding to a different SS/PBCH block.

If for a transmission of the first length (e.g., short length) RA preamble using a RACH occasion from the associated set (e.g., the first set) of RACH occasions, the following conditions may be met: the WTRU has reached maximum WTRU transmit power limit for all candidate WTRU transmit beams, and the WTRU determines a blockage based on the received backscatter power of the RA preamble transmission. In some embodiments, if the received backscatter power ($P_{BS}$) is greater than the backscatter measurement threshold ($\lambda P_{Tx}$), (i.e., if $P_{BS} > \lambda P_{Tx}$), and the WTRU does not receive a RAR for the transmitted RA preamble within the RAR window, the WTRU may select and transmit a second length RA preamble using a RACH occasion of the associated set (e.g., second set) of RACH occasions, which is corresponding to the chosen SS/PBCH block. In some embodiments, the second length is a long length.

The WTRU may wait again for receipt of a RAR from the gNB. The sequence of transmitting and waiting may continue until the gNB may respond with a RAR or until the maximum number of random access preamble transmissions may have been reached.

In some embodiments, for the backscatter measurement threshold, the WTRU may be configured with a fixed threshold (T), which may be independent of the transmit power to detect the blockage. For example, if the received backscatter power of the transmitted RA preamble ($P_{BS}$), is greater than the configured fixed threshold ($P_{BS} > T$), then the WTRU may determine that the direction is blocked.

Additionally, or alternatively, the WTRU may be configured with multiple JCS backscatter measurement thresholds (e.g., multiple JCS backscatter power fraction factors or multiple fixed backscatter measurement thresholds) and multiple sets of RACH preambles, each set with different preamble length, and associated set of RACH occasions. Each threshold may be associated with one set of RACH preambles and the corresponding set of RACH occasions.

In some embodiments, on a condition that the WTRU reaches the maximum power limit for all candidate WTRU transmit beams while transmitting a RA preamble from a set of RA preambles (e.g., with a first length of RA preambles), and if the WTRU does not receive any RAR within the configured RAR window, the WTRU may select another set of RA preambles with a length different from the first length for retransmissions, depending on the exceeded backscatter measurement threshold. For example, the WTRU may select another set of RA preambles which is associated with the exceeded backscatter measurement threshold.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a receiver configured to receive configuration information, wherein the configuration information includes a backscatter power fraction of a WTRU transmit power and a minimum random access channel (RACH) preamble retransmission interval;
a transmitter configured to transmit a RACH preamble in a RACH occasion using an initial transmit beam;
circuitry configured to measure backscatter power using a receive beam corresponding to the initial transmit beam;
the transmitter configured to, on a condition that the measured backscatter power is greater than the backscatter power fraction of the WTRU transmit power, and no random access response (RAR) is received within the minimum RACH preamble retransmission interval, retransmit the RACH preamble using an alternate beam selected based on the backscatter power measurement; and
the receiver configured to monitor a physical downlink control channel (PDCCH) common search space during a first RAR window interval and during a second RAR window interval, wherein the second RAR window interval is determined based on a backscatter power threshold-based adaptive retransmission rule.

2. The WTRU of claim 1, wherein the minimum RACH preamble retransmission interval is less than the first RAR window interval.

3. The WTRU of claim 2, wherein the first RAR window interval and the second RAR window interval overlap.

4. The WTRU of claim 1, wherein the transmitter is configured to retransmit the RACH preamble using a power ramp-up by N steps, where N is greater than one.

5. The WTRU of claim 1, wherein the WTRU is configured with multiple backscatter power thresholds, each backscatter threshold having an associated minimum RACH preamble retransmission interval.

6. The WTRU of claim 1, wherein the WTRU is configured with a RAR window reduction factor and the first RAR window interval for a RACH preamble transmission is reduced by the RAR window reduction factor when the measured backscatter power is greater than the backscatter power fraction of the WTRU transmit power.

7. The WTRU of claim 1, wherein the condition of the measured backscatter power being greater than the backscatter power fraction of the WTRU transmit power indicates that a direction is blocked.

8. The WTRU of claim 1, wherein the transmitter is further configure to, on a condition that the receiver receives a RAR within the first RAR window or the second RAR window, transmit a message using the configuration included in the RAR.

9. The WTRU of claim 1, wherein the configuration information includes a joint communications and sensing (JCS) reference signal configuration.

10. The WTRU of claim 1, wherein the RACH preamble corresponds to a synchronization signal block (SSB) index.

11. The WTRU of claim 1, wherein the initial transmit beam is associated with a first random access radio network temporary identifier (RA-RNTI).

12. The WTRU of claim 11, wherein the RACH preamble is retransmitted on resources associated with a second RA-RNTI.

13. The WTRU of claim 12, wherein the receiver is configured to monitor the PDCCH common search space using the first RA-RNTI during the first RAR window interval and using the second RA-RNTI during the second RAR window interval.

14. A method performed by a wireless transmit/receive unit (WTRU) comprising:
   receiving configuration information, wherein the configuration information includes a backscatter power fraction of a WTRU transmit power and a minimum random access channel (RACH) preamble retransmission interval;
   transmitting a RACH preamble in a RACH occasion using an initial transmit beam;
   measuring backscatter power using a receive beam corresponding to the initial transmit beam;
   retransmitting using an alternate beam selected based on the backscatter power measurement, on a condition that the measured backscatter power is greater than the backscatter power fraction of the WTRU transmit power, and no random access response (RAR) is received within the minimum RACH preamble retransmission interval, the RACH preamble; and
   monitoring a physical downlink control channel (PDCCH) common search space during a first RAR window interval and during a second RAR window interval, wherein the second RAR window interval is determined based on a backscatter power threshold-based retransmission rule.

15. The method of claim 14, wherein the configuration information includes a joint communications and sensing (JCS) reference signal configuration.

16. The method of claim 14, wherein the RACH preamble corresponds to a synchronization signal block (SSB) index.

17. The method of claim 14, wherein the initial transmit beam is associated with a first random access radio network temporary identifier (RA-RNTI).

18. The method of claim 17, wherein the RACH preamble is retransmitted on resources associated with a second RA-RNTI.

19. The method of claim 18, wherein the receiver is configured to monitor the PDCCH common search space using the first RA-RNTI during the first RAR window interval and using the second RA-RNTI during the second RAR window interval.

* * * * *